(12) United States Patent

Stokosa

(10) Patent No.: US 12,591,243 B2

(45) Date of Patent: Mar. 31, 2026

(54) PATH DETERMINATION FOR AUTOMATIC MOWERS

(71) Applicant: Doosan Bobcat North America, Inc., West Fargo, ND (US)

(72) Inventor: Dylan Stokosa, Lincoln, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 422 days.

(21) Appl. No.: 18/164,803

(22) Filed: Feb. 6, 2023

(65) Prior Publication Data

US 2023/0251669 A1    Aug. 10, 2023

Related U.S. Application Data

(60) Provisional application No. 63/307,383, filed on Feb. 7, 2022.

(51) Int. Cl.
*G05D 1/02* (2020.01)
*G05D 1/00* (2006.01)

(52) U.S. Cl.
CPC .................................. *G05D 1/0274* (2013.01)

(58) Field of Classification Search
CPC .. G05D 1/0274; G05D 1/0221; G05D 1/0278; G05D 1/0219; A01B 69/008; A01D 34/008
See application file for complete search history.

(56) References Cited

U.S. PATENT DOCUMENTS

| | | | |
|---|---|---|---|
| 5,204,814 A | | 4/1993 | Noonan et al. |
| 5,426,584 A | * | 6/1995 | Kamimura ........... G01C 15/002 356/152.3 |
| 5,444,965 A | | 8/1995 | Colens |
| 5,652,706 A | * | 7/1997 | Morimoto .......... G01C 21/3415 340/460 |
| 6,604,348 B2 | | 8/2003 | Hunt |
| 7,668,631 B2 | | 2/2010 | Bernini |
| 7,953,526 B2 | | 5/2011 | Durkos et al. |
| 8,195,331 B2 | | 6/2012 | Myeong et al. |
| 8,239,083 B2 | | 8/2012 | Durkos et al. |
| 8,947,531 B2 | * | 2/2015 | Fischer ................... G01S 7/003 348/148 |
| 8,958,939 B2 | | 2/2015 | Einecke et al. |
| 9,026,299 B2 | | 5/2015 | Johnson et al. |

(Continued)

FOREIGN PATENT DOCUMENTS

| | | | | |
|---|---|---|---|---|
| CN | 206461995 U | | 9/2017 | |
| CN | 107901917 A | * | 4/2018 | ............ B60W 50/00 |

(Continued)

OTHER PUBLICATIONS

CN-107901917-A machine translation (Year: 2018).*

(Continued)

*Primary Examiner* — Angelina M Shudy

(74) *Attorney, Agent, or Firm* — Quarles & Brady LLP

(57) ABSTRACT

Methods and systems are provided for controlling automatic travel of a power machine, particularly a mower. A set of points associated with a geographical area can be used to define a work path for a work task associated with the geographical area. The power machine can be controlled to perform the work task by traveling along the work path.

19 Claims, 11 Drawing Sheets

(56) References Cited

U.S. PATENT DOCUMENTS

| | | | |
|---|---|---|---|
| 9,439,348 B2 | 9/2016 | Biber et al. | |
| 9,563,204 B2 | 2/2017 | Willgert | |
| 9,848,529 B2 | 12/2017 | Franzius et al. | |
| 9,915,947 B1* | 3/2018 | LaForge | G05D 1/0278 |
| 10,093,355 B1* | 10/2018 | Wang | E02F 9/2045 |
| 10,104,837 B2 | 10/2018 | Hashimoto et al. | |
| 10,159,180 B2 | 12/2018 | Balutis et al. | |
| 10,212,880 B2 | 2/2019 | Cmich et al. | |
| 10,321,625 B2 | 6/2019 | Einecke et al. | |
| 10,375,880 B2 | 8/2019 | Morin et al. | |
| 10,448,565 B2 | 10/2019 | Mannefred et al. | |
| 10,466,710 B2 | 11/2019 | Biber et al. | |
| 10,542,670 B2 | 1/2020 | Cmich et al. | |
| 10,627,822 B2 | 4/2020 | Lee et al. | |
| 10,674,660 B2 | 6/2020 | Matsuzawa et al. | |
| 10,698,417 B2 | 6/2020 | Churavy et al. | |
| 10,890,908 B2* | 1/2021 | Iida | B60W 30/09 |
| 10,932,409 B2 | 3/2021 | Ingvalson et al. | |
| 10,980,173 B2 | 4/2021 | Becke et al. | |
| 11,140,813 B1* | 10/2021 | Morrison | G06N 20/00 |
| 11,172,607 B2 | 11/2021 | Hahn et al. | |
| 11,269,349 B2 | 3/2022 | Shao et al. | |
| 11,334,083 B2 | 5/2022 | Chen et al. | |
| 11,348,269 B1 | 5/2022 | Afrouzi et al. | |
| 11,350,563 B2 | 6/2022 | Kraft | |
| 11,372,405 B2* | 6/2022 | Pfaff | E02F 9/262 |
| 11,644,843 B2* | 5/2023 | Lacaze | G05D 1/027 |
| | | | 701/25 |
| 11,696,525 B2* | 7/2023 | Koto | A01D 34/008 |
| | | | 701/23 |
| 11,980,114 B2* | 5/2024 | Suleman | A01B 69/008 |
| 2009/0228166 A1* | 9/2009 | Durkos | G05D 1/0278 |
| | | | 701/26 |
| 2010/0198513 A1* | 8/2010 | Zeng | G01S 13/931 |
| | | | 701/300 |
| 2011/0160961 A1* | 6/2011 | Wollenhaupt | A01B 69/008 |
| | | | 701/41 |
| 2011/0295424 A1* | 12/2011 | Johnson | G05D 1/0265 |
| | | | 700/248 |
| 2012/0265391 A1* | 10/2012 | Letsky | G05D 1/0221 |
| | | | 701/25 |
| 2013/0025248 A1* | 1/2013 | Kraft | A01D 34/008 |
| | | | 701/25 |
| 2015/0012164 A1* | 1/2015 | Yu | G05D 1/0274 |
| | | | 701/23 |
| 2015/0142308 A1* | 5/2015 | Schmidt | G01C 21/3664 |
| | | | 701/467 |
| 2016/0174459 A1* | 6/2016 | Balutis | A01D 34/008 |
| | | | 701/25 |
| 2016/0282868 A1* | 9/2016 | Yamamura | G05D 1/0274 |
| 2016/0338262 A1 | 11/2016 | Liu et al. | |
| 2018/0035606 A1 | 2/2018 | Burdoucci | |
| 2018/0100740 A1* | 4/2018 | Seo | A01B 69/008 |
| 2018/0317368 A1 | 11/2018 | Du et al. | |
| 2018/0352730 A1 | 12/2018 | Gorenflo et al. | |
| 2019/0003137 A1* | 1/2019 | Gao | G05D 1/69 |
| 2019/0101649 A1* | 4/2019 | Jensen | G01S 17/89 |
| 2019/0171214 A1 | 6/2019 | Cestonaro et al. | |
| 2019/0216014 A1 | 7/2019 | Hahn et al. | |
| 2019/0222043 A1 | 7/2019 | Jiao et al. | |
| 2019/0239416 A1* | 8/2019 | Green | G05D 1/0219 |
| 2019/0258267 A1 | 8/2019 | Hahn et al. | |
| 2019/0265724 A1 | 8/2019 | Sheng et al. | |
| 2019/0265725 A1* | 8/2019 | Shao | G05D 1/0219 |
| 2019/0360835 A1* | 11/2019 | Gariepy | G01C 21/3614 |
| 2019/0362146 A1* | 11/2019 | Polzounov | G06T 7/10 |
| 2019/0369620 A1* | 12/2019 | Zhou | G05D 1/2464 |
| 2019/0380267 A1 | 12/2019 | Maggard | |
| 2020/0029488 A1* | 1/2020 | Bertucci | G06F 18/2113 |
| 2020/0037498 A1* | 2/2020 | Ko | G06Q 30/02 |
| 2020/0050208 A1* | 2/2020 | Frick | G05D 1/0088 |
| 2020/0064144 A1* | 2/2020 | Tomita | B62D 6/00 |
| 2020/0073403 A1 | 3/2020 | Abramson et al. | |
| 2020/0096631 A1 | 3/2020 | Egard et al. | |

| | | | |
|---|---|---|---|
| 2020/0120863 A1 | 4/2020 | Liu et al. | |
| 2020/0150647 A1* | 5/2020 | Haneda | G05D 1/005 |
| 2020/0159246 A1* | 5/2020 | Cui | A47L 9/2852 |
| 2020/0170186 A1 | 6/2020 | Curtis | |
| 2020/0172166 A1 | 6/2020 | Chang et al. | |
| 2020/0173784 A1 | 6/2020 | Chang | |
| 2020/0201347 A1 | 6/2020 | Dalfra et al. | |
| 2020/0229344 A1 | 7/2020 | Du et al. | |
| 2020/0238531 A1* | 7/2020 | Lee | B25J 9/1697 |
| 2020/0275605 A1 | 9/2020 | Chen et al. | |
| 2020/0281114 A1 | 9/2020 | Jägenstedt et al. | |
| 2020/0356088 A1* | 11/2020 | Schlacks, IV | G05D 1/6985 |
| 2021/0018927 A1* | 1/2021 | Ackerman | G05D 1/0268 |
| 2021/0064036 A1* | 3/2021 | Muro | G05D 1/0212 |
| 2021/0070356 A1* | 3/2021 | Lyzen | G05D 1/028 |
| 2021/0100161 A1 | 4/2021 | Balutis et al. | |
| 2021/0100166 A1 | 4/2021 | Becke et al. | |
| 2021/0112708 A1* | 4/2021 | Kameyama | G05D 1/0088 |
| 2021/0132624 A1* | 5/2021 | Andriolo | G05B 19/19 |
| 2021/0161066 A1 | 6/2021 | Ingvalson et al. | |
| 2021/0232146 A1* | 7/2021 | Muro | G05D 1/0217 |
| 2021/0253131 A1 | 8/2021 | Sen et al. | |
| 2021/0302569 A1 | 9/2021 | Lincoln et al. | |
| 2021/0302999 A1* | 9/2021 | Yokoyama | G05D 1/0274 |
| 2022/0091271 A1 | 3/2022 | Iwase et al. | |
| 2022/0107648 A1* | 4/2022 | Ratanaphanyarat | A47L 9/2831 |
| 2022/0145691 A1* | 5/2022 | Frick | E05F 15/73 |
| 2022/0151146 A1 | 5/2022 | Landin | |
| 2022/0151147 A1 | 5/2022 | Chen et al. | |
| 2022/0159899 A1* | 5/2022 | Nishii | A01B 69/008 |
| 2022/0167552 A1* | 6/2022 | Frick | G05D 1/0246 |
| 2022/0174868 A1* | 6/2022 | Flygare | G05D 1/0217 |
| 2022/0185317 A1 | 6/2022 | Kraft et al. | |
| 2022/0197295 A1* | 6/2022 | Xu | G05D 1/0246 |
| 2022/0272890 A1* | 9/2022 | Bertucci | G06F 18/2113 |
| 2022/0322602 A1* | 10/2022 | Mårtensson | H04W 72/542 |
| 2022/0405675 A1* | 12/2022 | Jang | G05D 1/0044 |
| 2022/0408630 A1* | 12/2022 | Nishii | A01B 69/008 |
| 2023/0011137 A1* | 1/2023 | Hebb | G05D 1/0219 |
| 2023/0042867 A1* | 2/2023 | Degnan | A01D 34/863 |
| 2023/0069475 A1* | 3/2023 | Porter | G05D 1/2462 |
| 2023/0094371 A1* | 3/2023 | Varma Bhupatiraju | A01B 69/001 |
| | | | 701/1 |
| 2023/0152810 A1* | 5/2023 | Kharagorgiiev | G05D 1/617 |
| | | | 701/25 |
| 2023/0263093 A1* | 8/2023 | Suffolk | H02J 7/0044 |
| | | | 701/23 |
| 2023/0280757 A1* | 9/2023 | Miyake | G05D 1/0238 |
| 2023/0315110 A1* | 10/2023 | Suzuki | G05D 1/0219 |
| | | | 701/25 |
| 2023/0323612 A1* | 10/2023 | Keyes | G05D 1/0214 |
| 2023/0324926 A1* | 10/2023 | Wallmark | G05D 1/0278 |
| | | | 701/26 |
| 2024/0045430 A1* | 2/2024 | Kudo | G05D 1/617 |
| 2024/0061433 A1* | 2/2024 | Fauteux | G05D 1/0278 |
| 2024/0065131 A1* | 2/2024 | Ellaboudy | G06V 10/454 |
| 2024/0077883 A1* | 3/2024 | Bertucci | A01B 79/005 |
| 2024/0103529 A1* | 3/2024 | Blom | G05D 1/243 |
| 2024/0126263 A1* | 4/2024 | Rothacker | G05D 1/6484 |
| 2024/0219925 A1* | 7/2024 | Barboi | G05D 1/0016 |
| 2024/0224849 A1* | 7/2024 | Peters, II | A01D 34/008 |
| 2024/0248484 A1* | 7/2024 | Frick | G01C 21/005 |
| 2024/0381803 A1* | 11/2024 | Wagner | G05D 1/2245 |
| 2024/0416748 A1* | 12/2024 | Pfaff | E02F 9/16 |
| 2025/0010804 A1* | 1/2025 | Pfaff | B60K 35/50 |
| 2025/0328142 A1* | 10/2025 | Ramsay | G06T 7/80 |

FOREIGN PATENT DOCUMENTS

| | | |
|---|---|---|
| EP | 2959764 A1 | 12/2015 |
| EP | 2586283 A1 | 7/2017 |
| KR | 101001076 B1 | 12/2010 |
| WO | 2010077198 A1 | 7/2010 |
| WO | 2018187692 A1 | 10/2018 |
| WO | 2020122583 A1 | 6/2020 |
| WO | 2020137135 A1 | 7/2020 |
| WO | 2020192802 A1 | 10/2020 |

(56)        References Cited

FOREIGN PATENT DOCUMENTS

| WO | 2021006437 | A1 | 1/2021 |
| WO | 2021014117 | A1 | 1/2021 |
| WO | 2021038287 | A1 | 3/2021 |

OTHER PUBLICATIONS

International Searching Authority, International Search Report and Written Opinion from corresponding PCT Application No. PCT/US2023/062023, mailed Oct. 9, 2023 [15 pgs].

* cited by examiner

100

700

705

RECEIVING A SET OF POINTS ASSOCIATED WITH A GEOGRAPHICAL AREA

710

RECORDING THE SET OF POINTS TO DEFINE A WORK PATH FOR A WORK TASK ASSOCIATED WITH THE GEOGRAPHICAL AREA

715

CONTROLLING THE POWER MACHINE TO PERFORM THE WORK TASK BY TRAVELING ALONG THE WORK PATH

PATH DETERMINATION FOR AUTOMATIC MOWERS

CROSS-REFERENCE TO RELATED APPLICATIONS

This application claims the benefit of and priority to U.S. Provisional Application No. 63/307,383, filed Feb. 7, 2022, the entirety of which is incorporated by reference herein.

BACKGROUND

This disclosure is directed toward power machines. More particularly, this disclosure is related to power machines for mowing operations, including zero-turn mowers configured to perform automatic mowing operations (e.g., automated mowing operations). Power machines, for the purposes of this disclosure, include any type of machine that generates power to accomplish a particular task or a variety of tasks. One type of power machine is a work vehicle. Work vehicles are generally self-propelled vehicles that have a work device that can be operated to perform a work function. For example, mowers can include a mower deck with one or more rotatable blades that can be operated to cut grass, brush, or other material as the mower travels over terrain. Other work vehicles include loaders (including mini-loaders), excavators, utility vehicles, tractors (including compact tractors), and trenchers, to name a few examples.

The discussion above is merely provided for general background information and is not intended to be used as an aid in determining the scope of the claimed subject matter.

SUMMARY

Some embodiments described herein relate to controlling a power machine to determine a work path for a mowing event (or other work task) and then automatically traveling along the work path to complete the mowing event (or other work task).

For example, one embodiment provides a method for controlling a power machine. The method includes receiving points associated with a geographical area. The method also includes, with an electronic processor, recording a set of the points associated with the geographical area to define a work path for a mowing event associated with the geographical area. The method also includes, with the electronic processor, controlling the power machine to perform the mowing event by traveling along the defined work path, wherein the power machine travels in a first direction along the work path by traveling successively to each point included in the set of points.

Another embodiment provides a power machine. The power machine includes a main frame, a work element coupled to the main frame, a plurality of electrical actuators coupled to the main frame, an electrical power source configured to power the plurality of electrical actuators, and an electronic controller in communication with the plurality of electrical actuators. The electronic controller is configured to operate in a learn mode in response to an operator input, including: receiving points associated with a geographical area and recording the set of points associated with the geographical area as a first work path for a work task associated with the geographical area. The electronic controller is also configured to, in response to receiving an operator selection associated with the first work path, control the power machine to perform the work task by traveling along the first work path in a first direction.

Yet another embodiment provides a method of controlling a power machine. The method includes receiving, with an electronic processor, a set of points associated with a geographical area. The method also includes defining, with the electronic processor, based on the set of points, a perimeter for mowing operations. The method also includes, with the electronic processor, determining a work path for a work task associated with the geographical area, wherein the work path is included within and determined based on the perimeter. The method also includes, with the electronic processor, controlling the power machine to perform the work task by traveling along the work path.

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DRAWINGS

Figure 4:
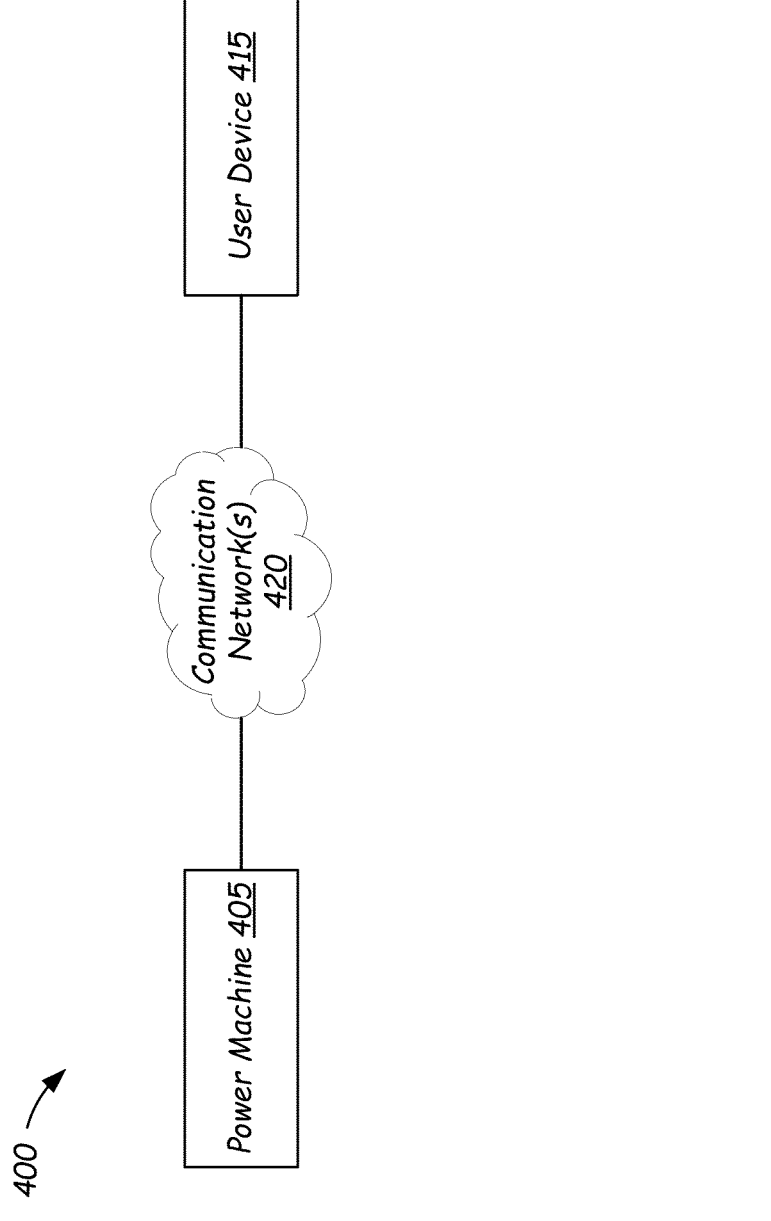

FIG. 4 schematically illustrates a system for controlling a power machine according to some embodiments.

Figure 5:
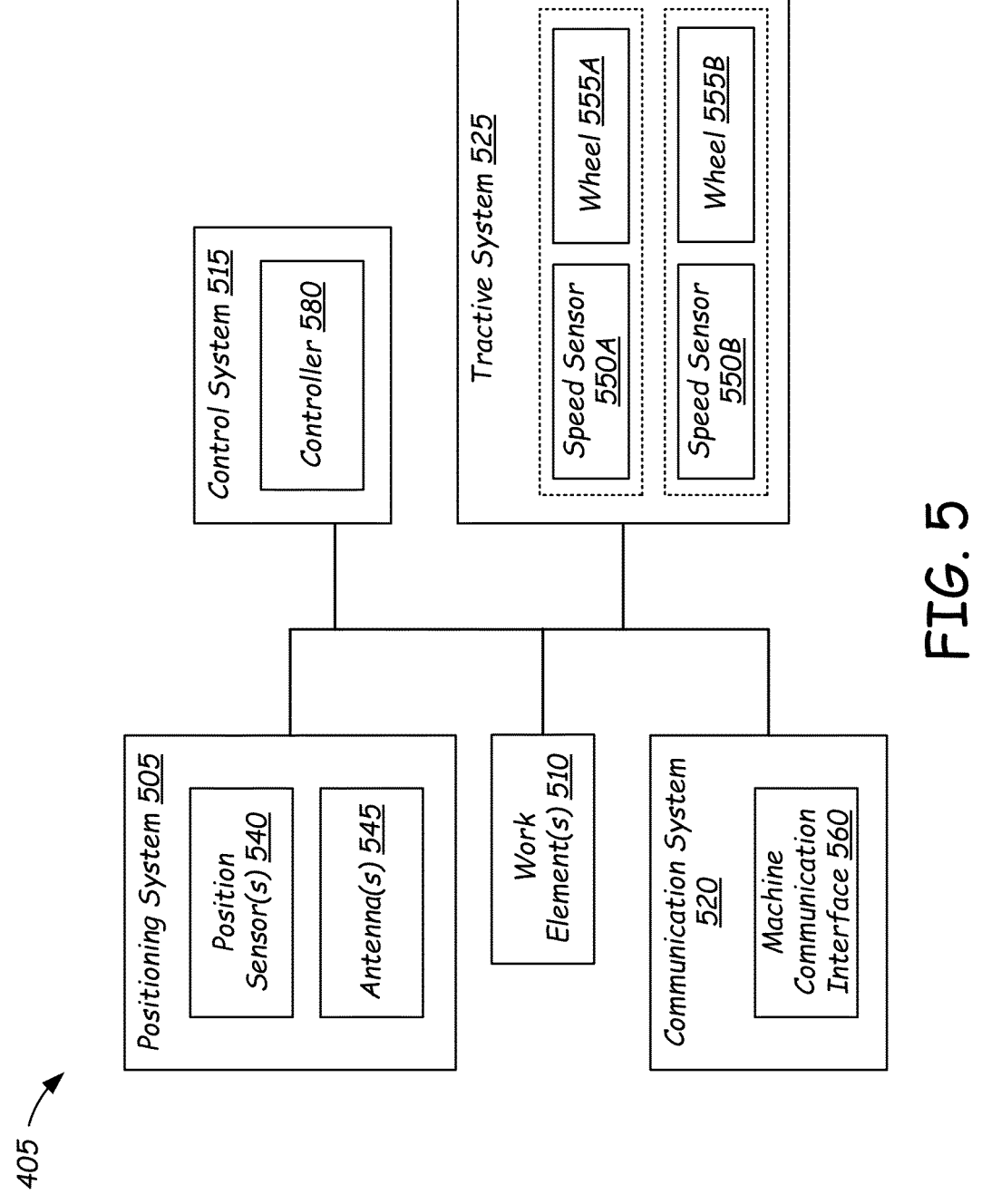

FIG. 5 schematically illustrates the power machine included in the system of FIG. 4 according to some embodiments.

Figure 6:
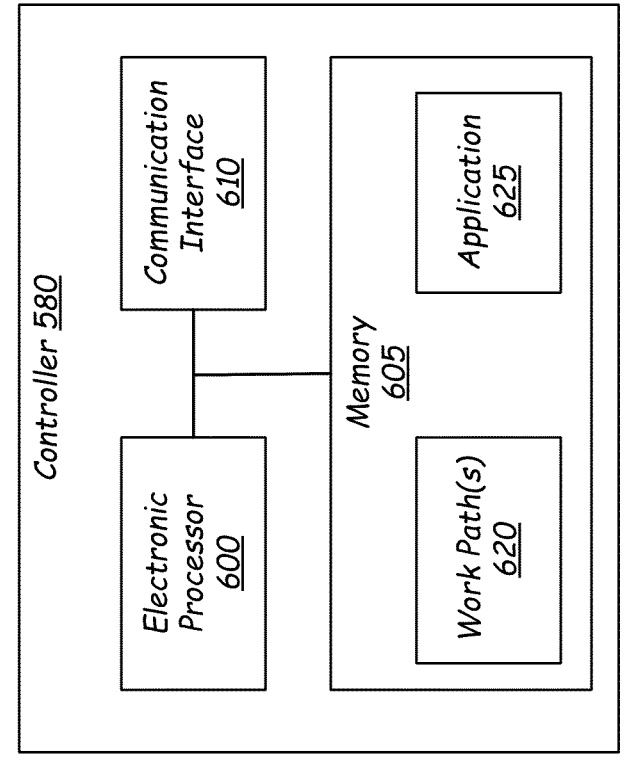

FIG. 6 schematically illustrates a controller of the power machine according to some embodiments.

Figure 7:
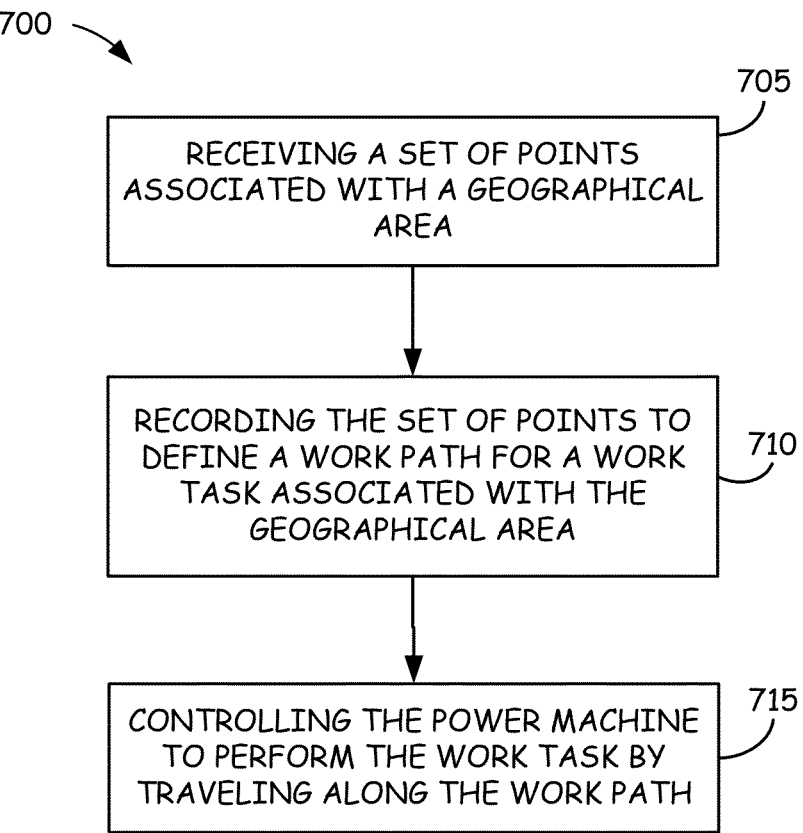

FIG. 7 is a flowchart illustrating a method of controlling a power machine using the system of FIG. 4 according to some embodiments.

Figure 8:
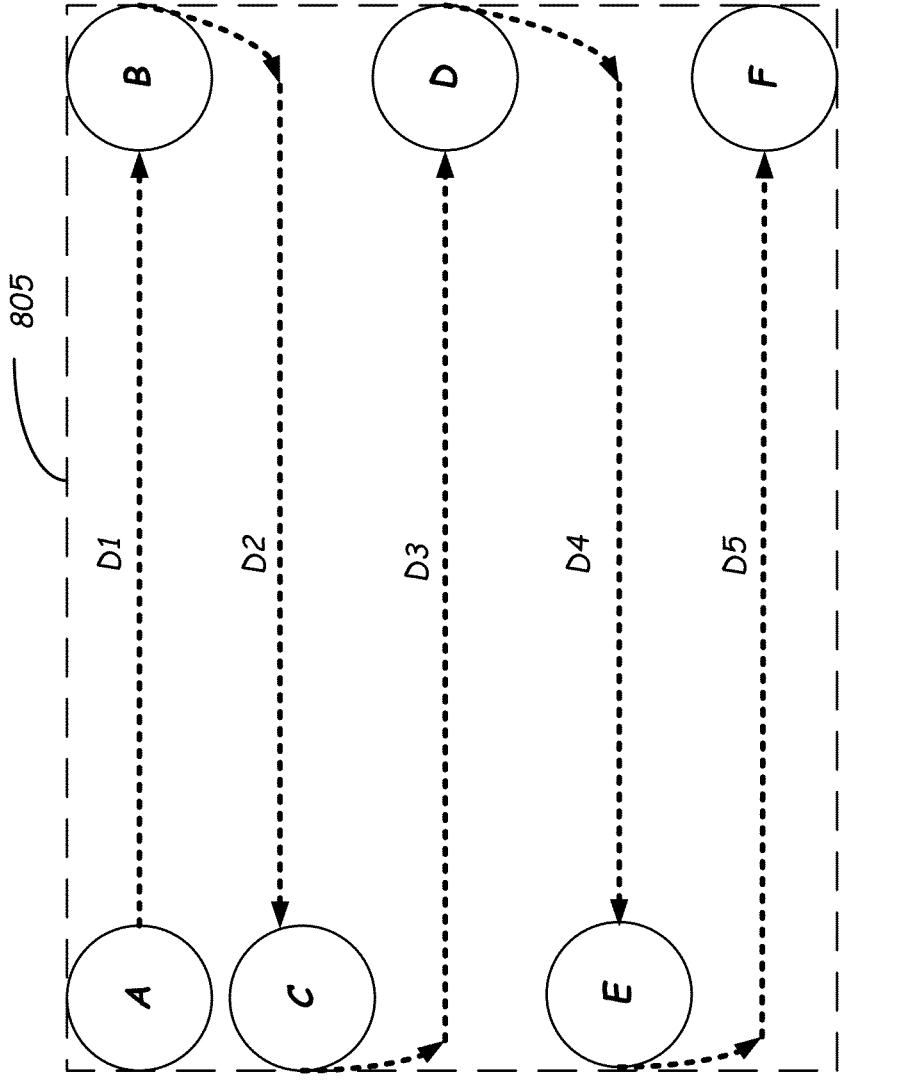

FIG. 8 schematically illustrates an example work path according to some embodiments.

Figure 9A:
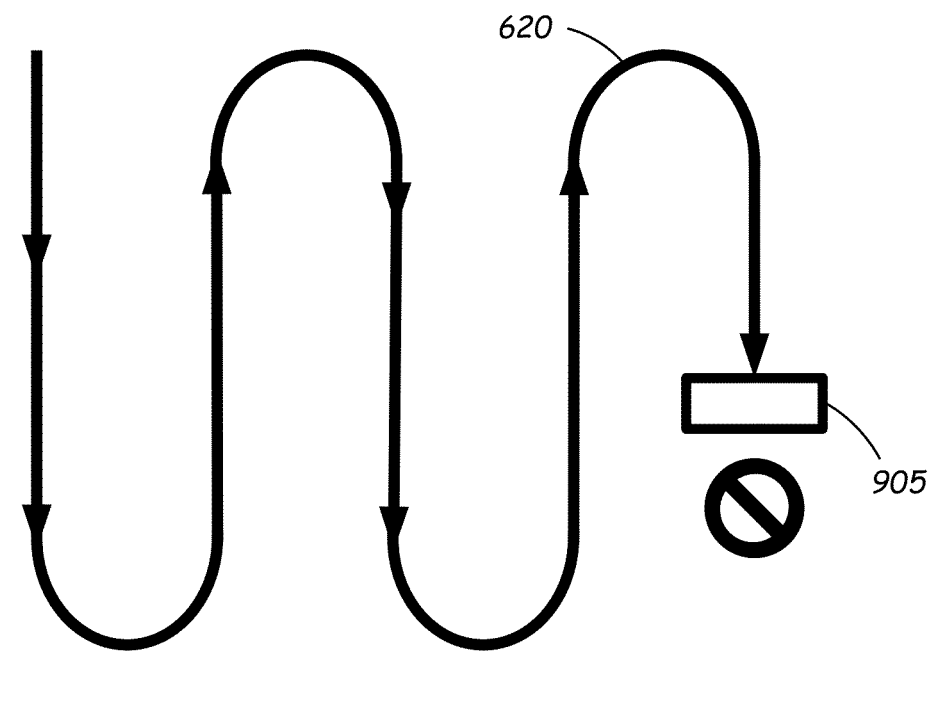
Figure 9B:
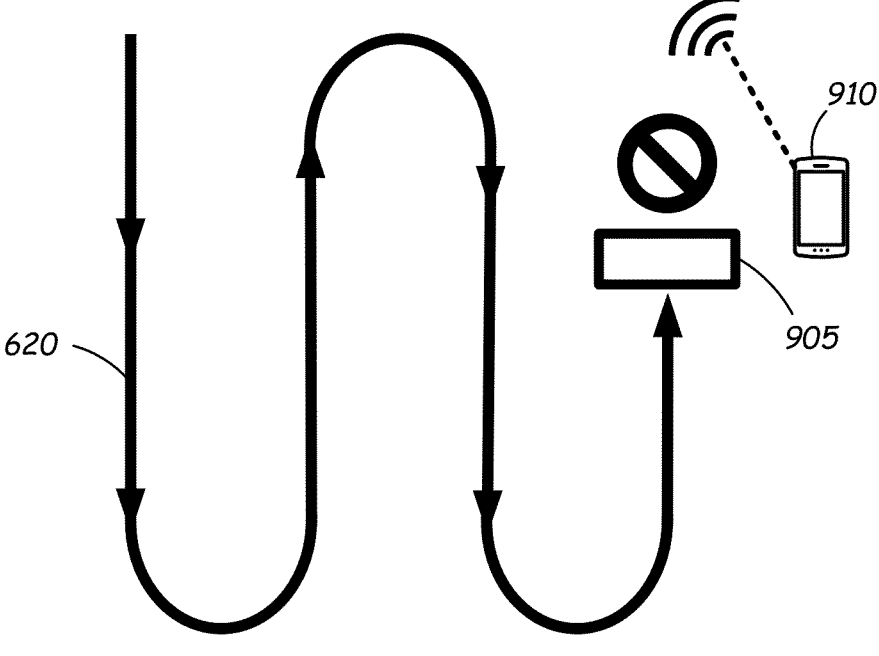
Figure 9C:
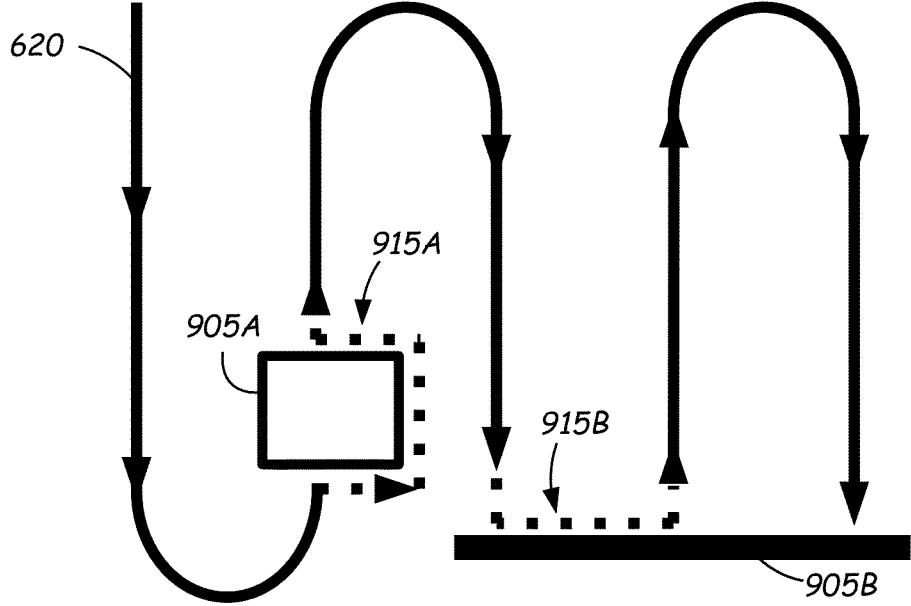

FIGS. 9A-9C schematically illustrate example work paths with objects positioned along each work path according to some embodiments.

Figure 10B:
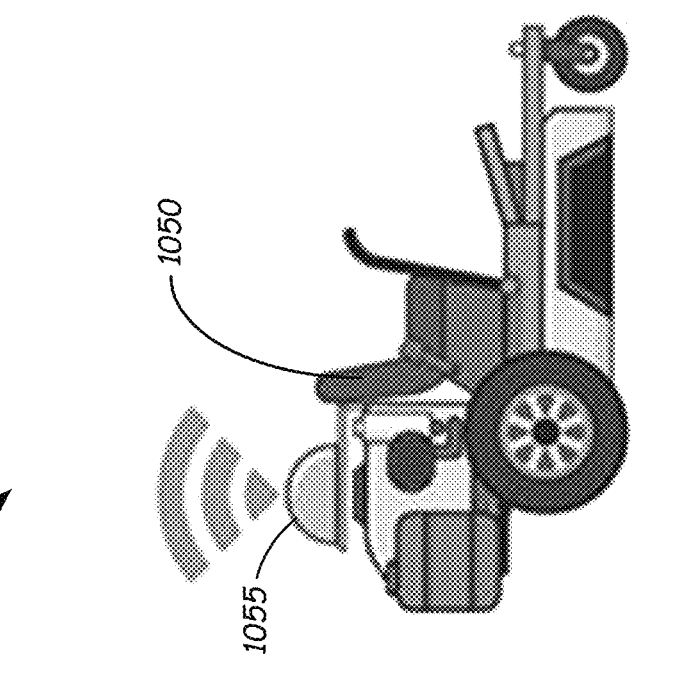
Figure 10A:
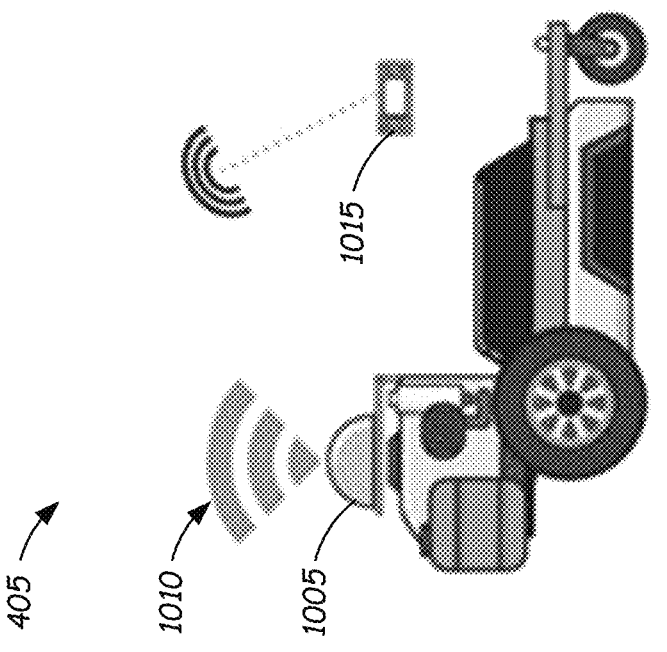

FIGS. 10A-10B illustrate example configurations of a power machine according to some embodiments.

DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As noted above, some power machines can be configured to perform automatic operations. For example, power machines configured for mowing operations (e.g., zero-turn mowers) can be configured to accomplish various automatic mowing operations. In some contexts, it may be useful to allow operators to customizably identify a path of travel for automatic operations, and in particular to allow operators to customizably identify a work path to complete a mowing event (e.g., to execute mowing operations for a particular geographical area).

Some embodiments described herein can provide improved systems and methods for determining work paths for power machines, and in particular can provide improved systems and methods for determining work paths for one or more mowing events. For example, a mobile user device or other input system can be used to receive a series of points that each represent a location in a geographical area, and the series of received points can be used to define a work path for one or more mowing events, e.g., a work path that includes each of the received points in a particular sequence. To complete a mowing event, a power machine can then be automatically controlled to travel along the work path (e.g., successively to each of the received points for the work path, in the particular sequence).

In some embodiments, points to define a work path can be received based on a present position of a power machine. For example, as an operator controls a mower to travel along a first path for a mowing event, successive locations of the mower along the path can be recorded as points, which can then be used to define a work path that effectively traces the first path. Thus, for example, operator judgment and control relative to the contours of the first path can be effectively recorded for repeated automatic travel over the first path.

In some embodiments, points to define a work path can be received from a mobile device. For example, a user can use a mobile device equipped with a positioning system (e.g., a satellite-based or beacon-based location system, etc.) to designate a set of points within a geographical area, including while the user moves around the geographical area separately from a relevant power machine. As generally discussed above, the designated points can then be used to define a work path along which the power machine can automatically travel.

In some embodiments, multiple paths for a power machine can be defined (e.g., as generally discussed above) and stored in a memory of a power machine (or a remote memory). Operation of the power machine can then include selecting one or more of the stored paths (e.g., based on an operator input that elects one or more paths or work operations) to be used to guide automatic travel for a work task.

Embodiments described herein relate to controlling a power machine for determining (e.g., learning) a work path for accomplishing a mowing event and automatically traversing the work path to accomplish the mowing event. These concepts can be practiced on various power machines, as will be described below. A representative power machine on which the embodiments can be practiced is illustrated in diagram form in FIG. 1 and one example of such a power machine is illustrated in FIG. 2 and described below before any embodiments are disclosed. For the sake of brevity, only one power machine is discussed. However, as mentioned above, the embodiments below can be practiced on any of a number of power machines, including power machines of different types from the representative power machine shown in FIG. 2. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power. In some examples, a power machine can be a self-propelled mower, including a mower with a work element configured as a mower deck with one or more rotating blades, and additional work elements configured as separately controllable right- and left-side drive elements to allow for independent drive control of the left and right sides of the traction system for the mower.

Figure 1:
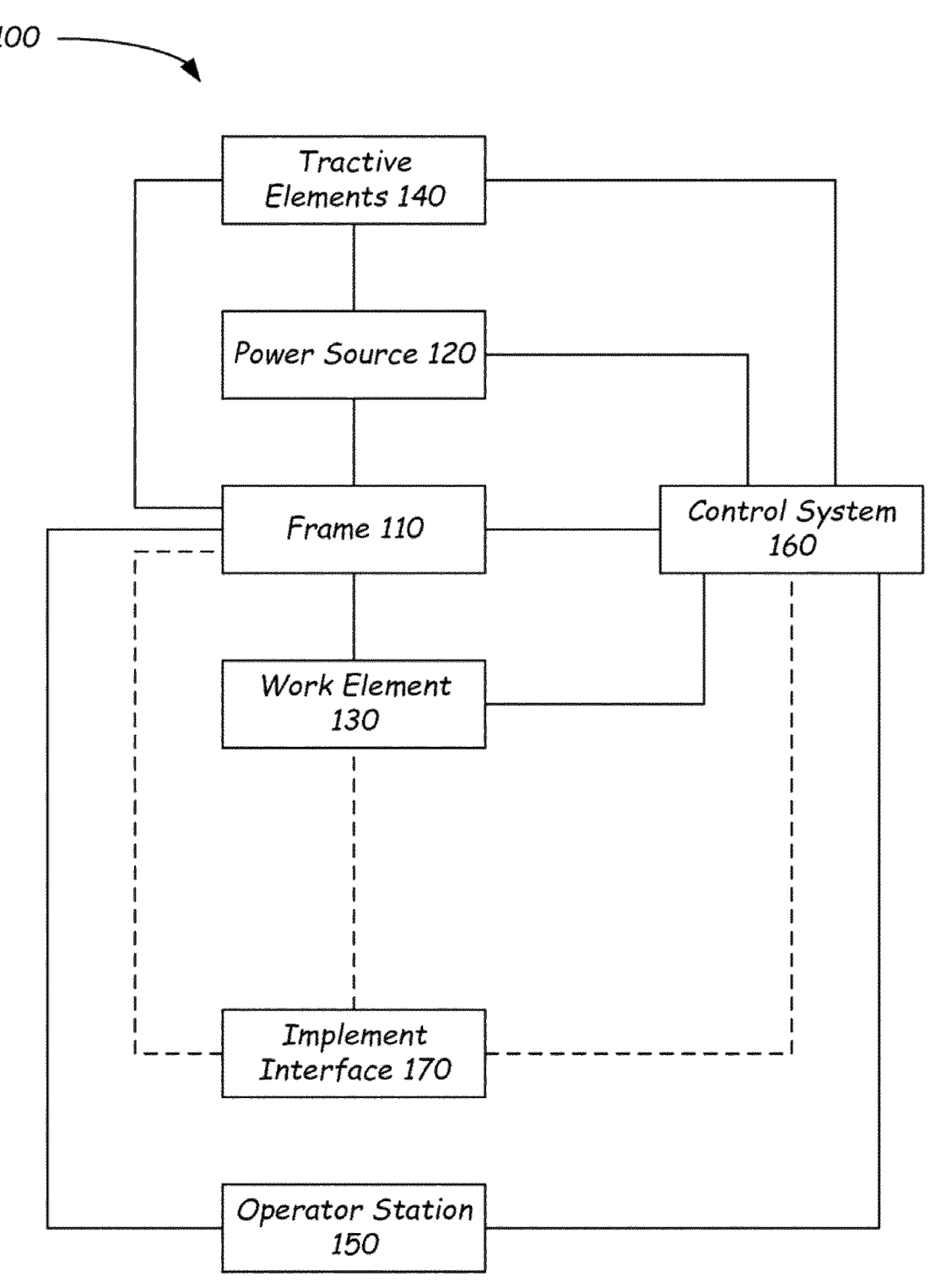
FIG. 1 is a block diagram illustrating functional systems of a representative power machine on which embodiments of the present disclosure can be advantageously practiced.
Figure 2:
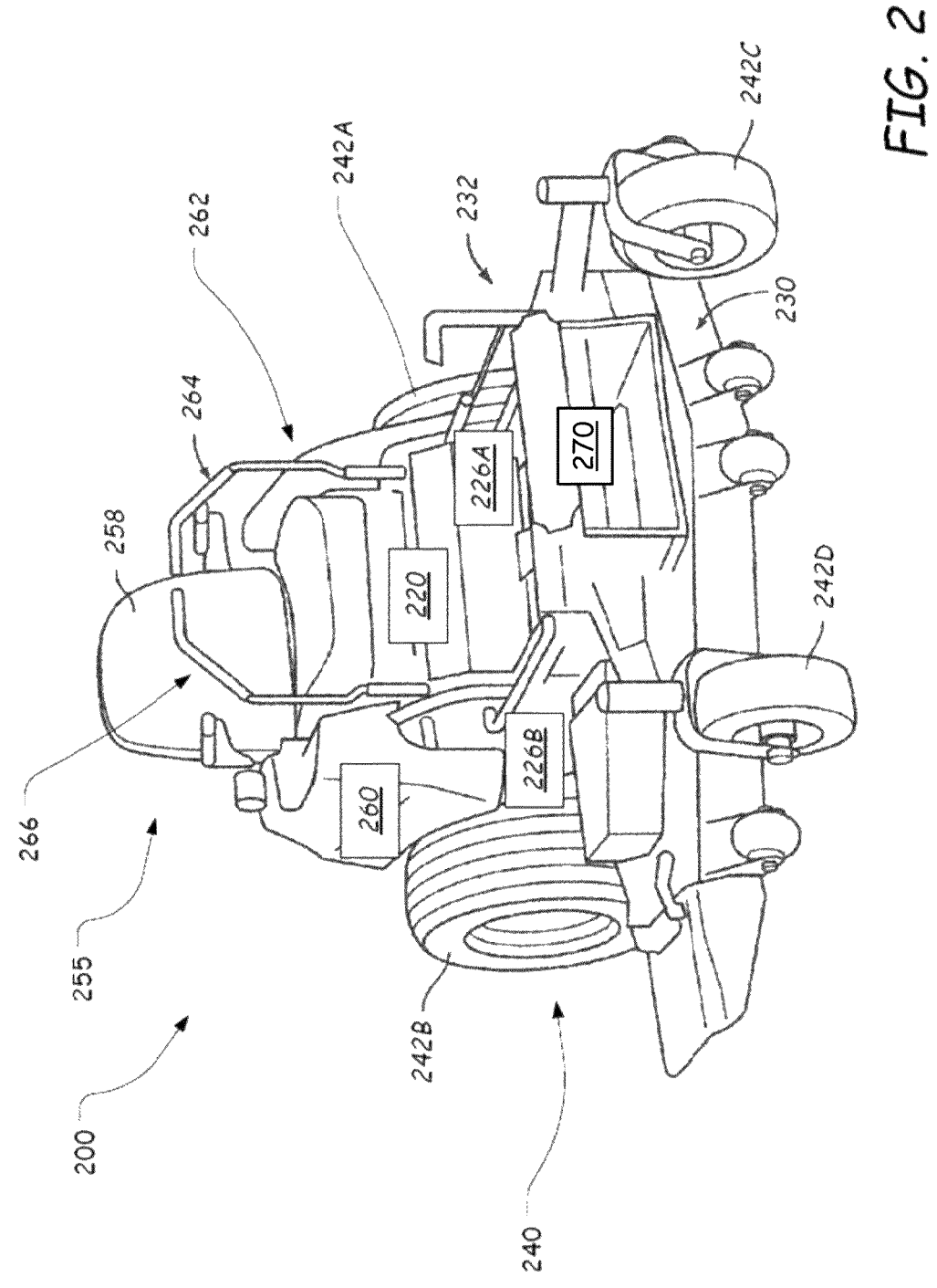
FIG. 2 is a perspective view showing generally a front of a power machine in the form of a zero turn mower on which embodiments disclosed in this specification can be advantageously practiced.

FIG. 1 is a block diagram that illustrates the basic systems of a power machine 100, which can be any of a number of different types of power machines and upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks (for example, at least in part in response to control signals provided by an operator). For example, the control system 160 can be an integrated or distributed architecture of one or more processor devices and one or more memories that are collectively configured to receive operator input or other input signals (e.g., sensor data) and to output commands accordingly for power machine operations. The control system 160 is described in greater detail below with respect to FIGS. 5 and 6.

Certain work vehicles have work elements that can perform a dedicated task. For example, some work vehicles have a mower deck that can be attached to a main frame of the work vehicles in various ways (e.g., as an implement attached to a lift arm). Cutting elements of the mower deck can then be controlled (e.g., to control speed of one or more rotating blades) or the mower deck can be otherwise manipulated (e.g., moved relative to the main frame of the power machine) to perform mowing or other tasks.

Some work vehicles may be able to accept other implements by disassembling a current implement/work element combination and reassembling with another implement in place of the original. Generally, work vehicles are intended to be used with a wide variety of implements and can have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130, or may include more complex mechanisms or structures. In some embodiments, the implement interface 170 can be a pinned connection that secures a mower deck to a movable support structure so that the support structure can be moved relative to a main frame of the power machine to adjust a height (or other orientation) of the mower deck.

The frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

The frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160 (e.g., a system of electronic, hydraulic, electro-hydraulic, or other control devices), which in turn selectively provides power to the elements that are capable of using the power to perform a work function. Power sources for power machines typically include an engine such as an internal combustion engine and a power conversion system such as a mechanical transmission or a hydraulic system that can convert the output from an engine into a form of power that is usable by a work element. Other types of power sources can be incorporated into power machines, including electrical sources or a combination of power sources, known generally as hybrid power sources.

FIG. 1 shows a single work element designated as a work element 130, but various power machines can have any number of work elements. Work elements are typically attached to the frame of the power machine and movable with respect to the frame when performing a work task. In some embodiments, as also discussed above, work elements can include mower decks or other similar equipment. In some embodiments, work elements can include lift arm assemblies or other similar systems. In addition, tractive elements 140 are a special case of work element in that their work function is generally to move the power machine 100 over a support surface. The tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame. In some power machines, such as zero turn mowers, one or more caster wheels or similar devices can be used along with rigidly mounted (as opposed to pivotally mounted) tractive elements to assist with turning by rotating in response to an uneven application of power (in magnitude and/or direction) on one side of the machine relative to the other.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIG. 2 illustrates a mower 200, which is one particular example of a power machine of the type illustrated in FIG. 1 where the embodiments discussed below can be advantageously employed. The mower 200 is one particular example of the power machine 100 illustrated broadly in FIG. 1 and discussed above. To that end, features of the mower 200 described below include reference numbers that are generally similar to those used in FIG. 1. For example, the mower 200 is described as having a frame 210, just as power machine 100 has the frame 110.

The mower 200 is shown as a zero-turn riding lawn mower, but it could also be a differently configured riding lawn mower, or a walk-behind or push-type lawn mower. For the purposes of this discussion, a zero-turn mower is a mower capable of executing a turn with a zero turn radius (i.e., the mower is capable of rotating about a vertical axis through the center of the machine to execute up to a 360 degree turn). For the sake of readability, the discussion below will discuss turns and refer to them as zero-turns, even though some turns may be performed with a non-zero turn radius. Correspondingly, the description herein of the mower 200 with references to FIG. 2 provides an illustration of the environment in which the embodiments discussed below can be practiced, and this description should not be considered limiting especially as to the description of features of the mower 200 that are not essential to the disclosed embodiments. Such features may or may not be included in power machines other than mower 200 upon which the embodiments disclosed below may be advantageously practiced. Unless specifically noted otherwise, embodiments disclosed below can be practiced on a variety of power machines, with the mower 200 being only one of those power machines. For example, some or all of the concepts discussed below can be practiced on many other types of work vehicles such as various other mowers, as well as loaders, excavators, trenchers, and dozers, to name but a few examples.

The mower 200 includes the frame 210 that supports a power system 220 that can generate or otherwise provide power for operating various functions on the power machine. The frame 210 also supports a work element in the form of a mower deck 230 that is powered by the power system 220 and that can perform various work tasks (e.g., cutting at different blade speeds or deck heights). As the mower 200 is a work vehicle, the frame 210 also supports a tractive system 240, which is also powered by a power system 220 and can propel the power machine over a support surface. In particular, in the illustrated example, the tractive system 240 includes powered wheels 242A, 242B, as further discussed below, as well as un-powered casters 242C, 242D, which are capable of rotation about a vertical or substantially vertical axis to assist with steering of the mower. The casters 242C, 242D will rotate in response to uneven application of power to the powered wheels 242A, 242B (in terms of magnitude and/or direction) to cause the mower to turn without skidding.

A deck support assembly 232 supports the deck 230 relative to the frame 210 and can be configured for selective adjustment to provide different cutting heights, angles, etc. for the deck 230, as well as for selective removal of the deck 230 or installation of additional or alternative work elements (e.g., other mower decks, ducts, and other material handling devices for cut plant material, etc.). The deck 230 can include one or more rotatable blades (not shown), which can be controlled (e.g., collectively or individually) to cut grass or other material, and which can be powered by hydraulic, electronic, or mechanical connections to the power system 220.

As a riding lawn mower, the mower 200 includes an operator station 255 supported on the frame 210, from which an operator can manipulate various control devices to cause the mower 200 to perform various work functions. In the illustrated example, in particular, the operator station 250 includes an operator seat 258, as well as the various operation input devices 262 in communication with a control system 260 (e.g., a hydraulic control system, or an electronic control system including an electronic hub controller and other distributed controllers that are electronically in communication with the hub controller). The input devices 262 generally allow an operator to control tractive elements and work elements, so that the mower 200 can be directed to move over terrain and selectively cut grass or other plants along the terrain (or otherwise executed desired work operations).

In some case, the input devices 262 can allow for tractive control of the mower 200. For example, the input devices 262 can include left- and right-side control levers 264, 266 that can be independently moved by an operator to direct, respectively, rotation of left- and right-side drive motors 226A, 226B for independent commanded rotation of left- and right-side tractive elements (e.g., the drive wheels 242A, 242B, as shown). In some cases, the levers 264, 266 can directly control delivery of hydraulic or other power. In some cases, the levers 264, 266 can indirectly control power delivery, including by adjusting a pilot flow for a powered hydraulic system of the mower 200 or by providing electronic signals that direct control of hydraulic, electronic, or other power delivery systems by way of one or more intervening hydraulic or electronic controllers included in the control system 260. Further, other configurations are possible for operator input devices, including configurations with different types of control levers that an operator can manipulate to control various machine functions. In some configurations, the operator input devices 262 can include a joystick (e.g., only a single electronic joystick for tractive operations), a steering wheel, buttons, switches, levers, sliders, pedals and the like, which can be stand-alone devices such as hand operated levers or foot pedals, or can be incorporated into hand grips or display panels, and can sometimes include programmable input devices.

As generally noted above, actuation of operator input devices can generate signals in the form of electrical signals, hydraulic signals, mechanical signals, or a combination thereof. Signals generated in response to operator input devices are provided to various components on the power machine for controlling various functions on the power machine. Among the functions that are controlled via operator input devices on the mower 200 are operational functions of the tractive system 240, the mower deck 230, other implements (not shown) including various other attachments (not shown), or a combination thereof.

In some cases, the control system 260 can be configured to operate without input from operator input devices 262 for one or more operations. For example, the control system 260 can be configured for automatic control of certain operations of the mower 200 or can include wireless communication capabilities so as to receive control commands or other relevant data from remotely located (i.e., not mechanically tethered) and other systems, as described in greater detail below.

Mowers can sometimes include other human-machine interfaces, including display devices that are provided in the operator station 255 to give indications of information relatable to the operation of the power machines in a form that can be sensed by an operator, such as, for example, audible or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such as walk behind mowers for example, may not have a cab nor an operator compartment, nor a seat. The operator position on such mowers is generally defined relative to a position where an operator is best suited to manipulate operator input devices.

Figure 3:
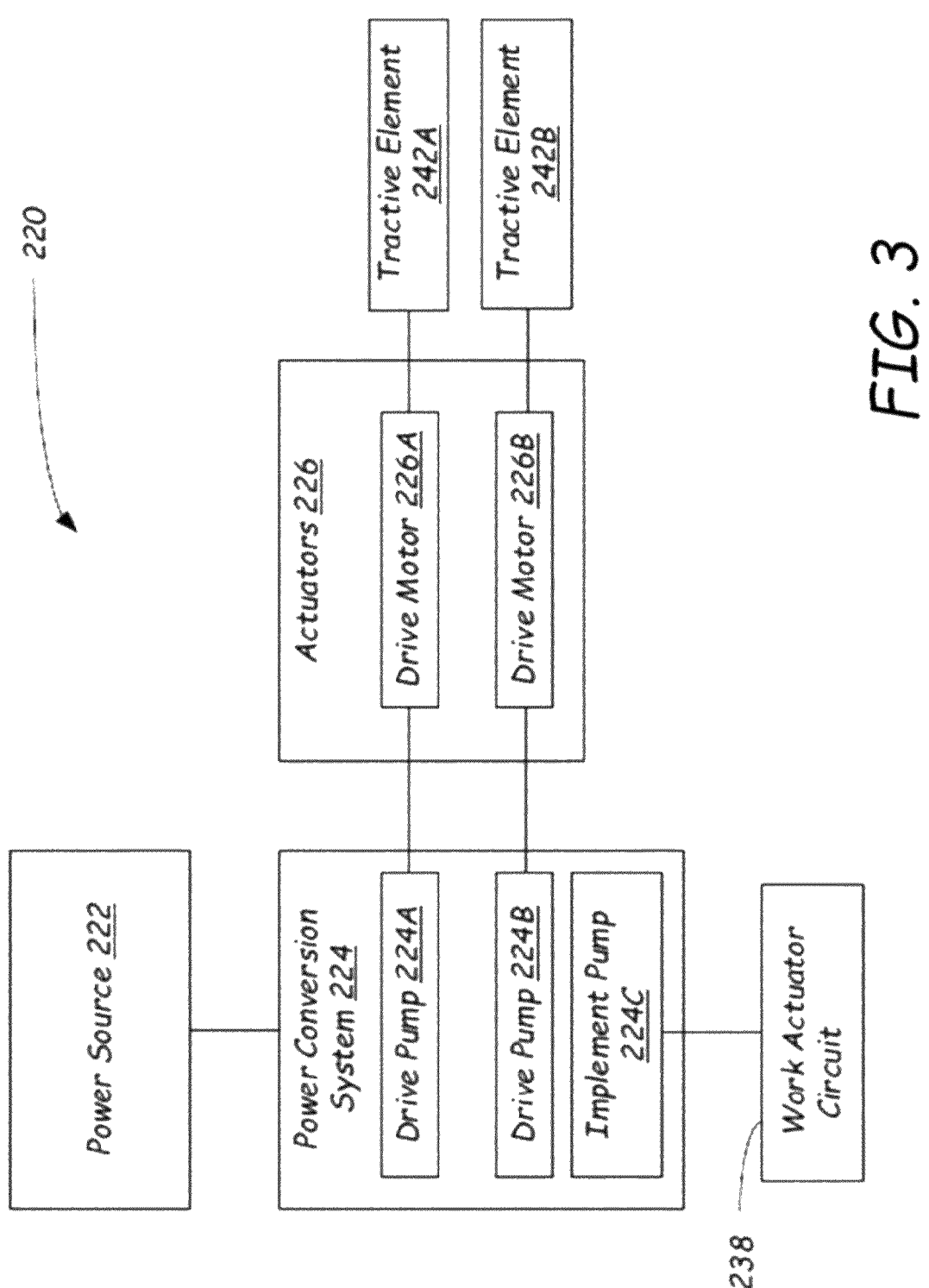
FIG. 3 is a block diagram illustrating components of a hydraulic power system of a power machine such as the mower of FIG. 2.

FIG. 3 illustrates an example of a power system 220 in more detail for a hydraulically powered system. Broadly speaking, the power system 220 includes one or more power sources 222 that can generate or store power for operating various machine functions. On the mower 200, the power system 220 includes an internal combustion engine. Other power machines can include electric generators, rechargeable or replaceable batteries, various other power sources or any combination of power sources that can provide power for given power machine components. The power system 220 also includes a power conversion system 224, which is operably coupled to the power source 222. The power conversion system 224 is, in turn, coupled to one or more actuators 226, which can perform a function on the power machine. Power conversion systems in various power machines can include various components, including mechanical transmissions, hydraulic systems, electric motors, and the like. In a hydraulically powered example, the power conversion system 224 of the mower 200 can include hydrostatic drive pumps 224A, 224B, which provide a pressurized hydraulic fluid to drive motors 226A, 226B, respectively. The drive motors 226A, 226B in turn are each operably coupled to a respective tractive element 242A, 242B (e.g., the wheels 242A, 242B as illustrated in FIG. 2). The hydrostatic drive pumps 224A, 224B can be mechanically, hydraulically, or electrically coupled to operator input devices (or otherwise in communication with the control system 260) to receive actuation signals for controlling the drive pump. The power conversion system 224 also includes an implement pump 224C, which can be driven by the power source 222 to provide pressurized hydraulic fluid to a work actuator circuit 238 for operation of a work actuator 239 (e.g., one or more motors for rotation of the blades of the deck 230). The work actuator circuit 238 can include valves and other devices to selectively provide pressurized hydraulic fluid to the various work actuators. In addition, the work actuator circuit 238 can be configured to provide pressurized hydraulic fluid to work actuators on an attached implement.

As also noted above, in some cases, actuators of a power machine (e.g., the mower 200) can be electrically powered. Correspondingly, in some cases, the power conversion system 224 may include electronic or other devices configured for transmission of current to, and general control of, one or more electric motors included in the actuators 226 (e.g., left- and right-side drive motors) and one or more electric motors of non-tractive work elements (e.g., electronic motors included on the deck 230 to power rotation of cutting blades).

The description of the power machine 100 and the mower 200 herein is provided for illustrative purposes, to provide illustrative environments on which the embodiments discussed below can be practiced. While the embodiments discussed can be practiced on a power machine such as is generally described by the power machine 100 shown in the block diagram of FIG. 1 and, more particularly, on a mower such as the zero-turn mower 200, unless otherwise noted or recited, the concepts discussed below are not intended to be limited in their application to the environments specifically described above.

FIG. 4 illustrates a system 400 for controlling a power machine according to some embodiments. In the illustrated example, the system 400 includes a power machine 405 (for example, the power machine 100 of FIG. 1 or the mower 200 of FIG. 2) and a user device 415 (e.g., a portable computing device, such as a tablet computer, a smart telephone, a smart wearable, or other suitable computing device). For example, in some embodiments, the user device 415 is a remote-control device for the power machine 405 such that an operation (via the user device 415) may control one or more operator-controlled functions on the power machine 405. In some embodiments, the system 400 includes fewer, additional, or different components than illustrated in FIG. 4 (e.g., multiple power machines or user devices). As illustrated in FIG. 4, the power machine 405 and the user device 415 communicate over one or more wired or wireless communication networks 420. Portions of the communication networks 420 may be implemented using a wide area network, such as the Internet, a local area network, such as Bluetooth® network or Wi-Fi, and combinations or derivatives thereof (Bluetooth is a registered trademark of Bluetooth SIG, Inc. in the United States or other jurisdictions.) In some embodiments, additional communication networks may be used to allow one or more components of the system 400 to communicate. Also, in some embodiments, components of the system 400 may communicate directly as compared to through a communication network 420 and, in some embodiments, the components of the system 400 may communicate through one or more intermediary devices not shown in FIG. 4.

FIG. 5 schematically illustrates the power machine 405 according to some embodiments. In the example illustrated in FIG. 5, the power machine 405 includes a positioning system 505, one or more work elements 510 (for example, the work elements 130, as described above), a control system 515 (for example, the control system 160, as described above), a communication system 520, and a tractive system 525. The positioning system 505, the work element(s) 510, the control system 515, the communication system 520, and the tractive system 525 communicate over one or more communication lines or buses. The power machine 405 may include additional, fewer, or different components than those illustrated in FIG. 5 in various configurations and may perform additional functionality than the functionality described herein. For example, the power machine 405 may include additional, similar, or different components, systems, and functionality as described above with respect to the power machine 100 of FIG. 1 and the mower 200 of FIG. 2. In some cases, as also discussed below, the work elements 510 can include a mower deck or other grounds maintenance implement such as, for example, sprayers, spreaders, blowers, aerators, dethatchers, etc.

The positioning system 505 is configured to collect (e.g., detect) position data associated with the power machine 405, such as, for example, position data associated with (e.g., specifying) a current position of the power machine 405. In some embodiments, the positioning system 505 is configured to collect position data of the power machine 405 in real-time (or near-real time). As illustrated in FIG. 5, the positioning system 505 may include one or more position sensors 540 configured to collect position data associated with the power machine 405. In some embodiments, the positioning system 505 may include an inertial measurement unit ("IMU"), as the position sensor 540, where the position data may include IMU information collected or detected using the IMU. In some embodiments, the positioning system 505 includes components for interoperation with a global navigation satellite system ("GNSS"), such as, for example, a global positioning system ("GPS"). Accordingly, in some embodiments, the positioning system 505 includes one or more additional components related to implementing or leveraging GPS data. For example, as illustrated in FIG. 5, the positioning system 505 may include one or more antennas 545 (including, for example, one or more corresponding receivers) configured to receive GPS data. In order to improve accuracy, the position system 505 may implement at least two antennas 545. In some embodiments the components of the positioning system 505 may be mounted or coupled to a main frame of the power machine 405. As one example, when the positioning system 505 includes two antennas 545, each antenna 545 may be mounted to a front portion of the main frame of the power machine 405, such as one antenna 545 near a front left wheel of the power machine 405 and another antenna 545 near a front right wheel of the power machine 405.

As described above with respect to the work elements 130 of FIG. 1, the work element 510 may be configured to perform a work task or operation, such as, for example, a mowing operation or task. In some embodiments, a work element 510 is a mower deck with one or more rotating blades that can be powered to perform a cutting operation (e.g., at different blade speeds or deck heights). The work element 510 may be attached or mounted to a main frame of the power machine 405 (e.g., the frame 110 of FIG. 1). For example, the work element 130 may be supported by a deck support assembly (e.g., the deck support assembly 232 of FIG. 2) relative to the main frame of the power machine 405.

In some embodiments, the work element 130 is movable with respect to the frame when performing a work task (e.g., a mowing event). Via selective adjustment of the deck support assembly, for example, the work element 510 may be configured to function at different cutting heights, angles, and the like.

As described in greater detail below, the work element 510 may be controlled by the control system 515 (for example, via one or more control signals received from the control system 515). As one example, a rotational speed of the one or more rotating blades may be controlled based on a control signal received from the control system 515. As another example, a height of the mowing deck and, ultimately, of the rotating blades, may be controlled based on a control signal received from the control system 515. Accordingly, in some embodiments, the work element 510 is associated with an actuator (not illustrated), such as a linear actuator.

As illustrated in FIG. 5, the power machine 405 also includes the tractive system 525 (e.g., the tractive system 240 of FIG. 2), which is configured to propel the power machine 405 over terrain or, more generally, a support surface. In the illustrated example, the tractive system 525 includes a set of speed sensors (e.g., a first speed sensor 550A and a second speed sensor 550B) and a set of wheels (e.g., a first wheel 555A and a second wheel 555B) (for example, the tractive elements 140 of FIG. 1). As similarly described above with respect to the powered wheels 242A and 242B of FIG. 2, the wheels 555A, 555B may be powered by a power system of the power machine 405 (for example, the power system 220 of FIG. 2). The speed sensors 550A, 550B are configured to collect (e.g., detect) speed data for a corresponding one of the wheels 555A, 555B. Accordingly, each speed sensor 550A, 550B can be associated with one of the wheels 555A, 555B (as represented in FIG. 5 by a dashed box). In the example illustrated in FIG. 5, the first speed sensor 550A is associated with the first wheel 555A and the second speed sensor 550B is associated with the second wheel 555B, although other configurations are possible.

The communication system 520 includes a machine communication interface 560, which allows the power machine 405 (e.g., one or more components thereof) to communicate with devices external to the power machine 405. As one example, referring also to FIG. 4, the power machine 405 may communicate with the user device 415 through the machine communication interface 560. The machine communication interface 560 may include a port for receiving a wired connection to an external device (e.g., a universal serial bus ("USB") cable and the like), a transceiver for establishing a wireless connection to an external device (e.g., over one or more communication networks 420, such as the Internet, local area network ("LAN"), a wide area network ("WAN"), and the like), or a combination thereof. As described in greater detail below, in some embodiments, the power machine 405 may transmit data to or receive data from the user device 415 via the communication system 520, including a path selection, a learn mode selection, another user input received via the user device 415, and the like. In such embodiments, one or more operations of the power machine 405 may be controlled (via one or more control signals generated by the control system 515) based on the operator inputs received at the user device 415.

The control system 515 (e.g., the control system 160 of FIG. 1) is configured to receive operator input or other input signals (e.g., sensor data, such as the speed data, the position data, or a combination thereof) and to output commands accordingly to control operation of the power machine 405. For example, the control system 515 can communicate with other systems of the power machine 405 to perform various work tasks, including to control tractive and implement actuators for travel and cutting operations over the course of a mowing event. In some embodiments, the control system 515 receives input from an operator input device, such as one of the operator input devices 262 of FIG. 2, including input as command signals provided by an operator of the power machine 405 via the operator input device. In response to receiving the input, the control system 515 may control the power machine 405 to perform a work task based at least in part on the input received from the operator input device.

Alternatively or in addition, as noted above, the control system 515 can be configured to complete one or more work tasks without specific, direct input from an operator (e.g., manipulation of the one or more operator input devices 262). Correspondingly, the control system 515 may be configured for automatic (e.g., automated) control of certain operations of the power machine 405. As one example, the control system 515 may include wireless communication capabilities (for example, via the communication system 520) so as to receive control commands or other relevant data from remotely located (i.e., not mechanically tethered) and other systems. In some such embodiments, the control system 515 can be configured to operate the power machine 405 in different control modes, with different levels of automatic control. For example, in a remote-control mode, the control system 515 can communicate with a remote user device so that an operator may provide real-time (or near real-time) control commands for controlling the power machine 405 (e.g., directional commands, speed commands, and the like). Alternatively, or in addition, the power machine 405 can function in some modes as an automatic power machine (e.g., in an automated operation mode). As described in greater detail below, in some such embodiments, an operator may select (via, for example, the user device 415) a work path or route for performing a mowing event associated with a geographical area. The control system 515 may receive the selection (via, for example, the communication system 520 through the communication network 420) and control the power machine 405 such that the power machine 405 travels along the work path, including to complete one or more mowing events for the geographical area.

As illustrated in FIG. 5, the control system 515 includes a controller 580. FIG. 6 illustrates the controller 580 according to some embodiments. In the illustrated example of FIG. 6, the controller 580 includes an electronic processor 600 (for example, a microprocessor, an application-specific integrated circuit (ASIC), or another suitable electronic device), a memory 605 (for example, a non-transitory, computer-readable medium), and a communication interface 610. The electronic processor 600, the memory 605, and the communication interface 610 communicate over one or more communication lines or buses. It should be understood that the controller 580 may include additional components than those illustrated in FIG. 6 in various configurations and may perform additional functionality than the functionality described herein. For example, in some embodiments, the functionality described herein as being performed by the controller 580 may be distributed among other components or devices.

The communication interface 610 allows the controller 580 to communicate with devices external to the controller 580. For example, as illustrated in FIG. 5, the controller 580 may communicate with the positioning system 505, the work element(s) 510, the tractive system 525, the communication system 520, or a combination thereof through the communication interface 610. The communication interface 610 may include a port for receiving a wired connection to an external device (for example, a universal serial bus ("USB") cabled and the like), a transceiver for establishing a wireless connection to an external device (for example, over one or more communication networks, such as the Internet, local area network ("LAN"), a wide area network ("WAN"), and the like), or a combination thereof. In some embodiments, the controller 580 can be a dedicated or stand-alone controller. In some embodiments, the controller 580 can be part of a system of multiple distinct controllers (e.g., a hub controller, drive controller, workgroup controller, etc.) or can be formed by a system of multiple distinct controllers (e.g., also with hub, drive, and workgroup controllers, etc.).

The electronic processor 600 is configured to access and execute computer-readable instructions ("software") stored in the memory 605. The software may include firmware, one or more applications, program data, filters, rules, one or more program modules, and other executable instructions. For example, the software may include instructions and associated data for performing a set of functions, including the methods described herein.

For example, as illustrated in FIG. 6, the memory 605 may store one or more work path(s) 620 (for example, as a set of work paths 620). Alternatively, or in addition, in some embodiments, the set of work paths 620 may be stored remotely, such as, for example, in a memory of the user device 415 or another remote device or database, such that each work path 620 is accessible by the controller 580.

The work path 620 may include, and is generally defined by, a set of positional points (e.g., a set of coordinates in two or three dimensional space) that are associated with performing a work task in a geographical area or region, or another encoded description of a path across terrain. For example, a work path may represent a path for a mower to travel in order to mow an entire designated portion of a geographical area. In some cases, the locations of a set of positional points can define turning locations for a work path, with the remainder of the work path defined as straight (or other) lines that successively connect adjacent pairs of the points.

Generally, the power machine 405 may travel along a work path 620 by sequentially traveling between each point included in the set of points. As one example, the power machine 405 may perform the work task of cutting grass at the geographical area by traveling successively to each point that forms the work path 620, while simultaneously controlling a work element, such as one or more rotating blades, to cut the grass.

In some embodiments, a set of points includes a start point, an end point, and a subset of intermediate points. The start point represents a beginning or start of the work path 620. The end point represents an end of the work path 620. The subset of intermediate points includes one or more intermediate points positioned between the start point and the end point along the path.

In some embodiments, an intermediate point along a work path may be associated with a particular operation (e.g., travel maneuver) of the power machine 405. For example, when the power machine 405 arrives at a particular intermediate point, the power machine 405 may perform a turn operation, such as a zero-radius turn centered on or otherwise located by the intermediate point. In some specific implementations, the stored work path 620 may include supplemental data in addition to a sequence of geographical points. The supplemental data may include, for example, instructions to execute a driving sub-routine (e.g., 90-degree turn, 180-degree turn, J-turn, etc.) or a heading for the power machine 405 to traverse from point A (a current position) to point B (a subsequent recorded point in the work path 620). Alternatively, controller 580 may conduct (near) real-time analysis of the respective points defining the work path and provide control signals to the drive pumps 224A/B to affect the desired speed and course to arrive at a subsequent point of the work path 620 and initiate any required turns. For example, upon arriving at Point N with a power machine heading of 0 degrees, the power machine 405 will determine the necessary heading to the next Point N+1, rotate the power machine to align with the heading to Point N+1 and travel to Point N+1.

In some embodiments, a set of points that define a work path may only include a start point and an end point. As one example, where the work path 620 is a straight line, the set of points may include a start point and an end point such that the power machine 405 traverses the entire work path 620 by traveling between the start point to the end point.

In some embodiments, each work path 620 of a plurality of work paths may be associated with a corresponding geographical region (e.g., part or all of a backyard, a field, a sports field, a highway ditch, a park, etc.). As one example, a first work path may be associated with a first geographical region and a second work path may be associated with a second geographical region different from the first geographical region. Alternatively, or in addition, in some embodiments, a work path 620 is associated with a specific work task that can be performed at a given geographical area. For example, a geographical area may be associated with a first work task and a second work task (e.g., different mowing operations), the first work task may be associated with a first work path, and the second work task may be associated with a second (e.g., different) work path. As one example, a first work path may be used to mow a first geographical region in a first direction or with a first overlap between passes, while a second work path may be used to mow the first geographical region in a second different (e.g., reverse or diagonal) direction or in the same direction of the first work path but with a second different overlap between passes.

As also illustrated in FIG. 6, the memory 605 may also store an application 625. The application 625 is a software application executable by the electronic processor 600. As described in greater detail below, the electronic processor 600 may execute the application 625 to receive a set of points and generate a work path 620 based on the set of points. Alternatively, or in addition, the electronic processor 600 may execute the application 625 to control the power machine 405 to perform a series of operations or maneuvers such that the power machine 405 traverses a work path 620 (for example, travel between the set of points forming the work path 620). In some embodiments, the electronic processor 600 may execute the application 625 to control the power machine 405 to traverse a work path 620 based on a work path selection (for example, an operator selection made via the user device 415). In some specific embodiments, application 625 (as executed by the electronic processor 600) receives work path 620 data stored in memory 605 and provides control signals to the power conversion system 224 (as shown in FIG. 3, for example) that motivate the power machine 405 to each consecutive geographical point of the stored work path. For each point (including intermediate points of the work path), application 625 may compare the desired position to telemetry data from positioning system 505 (including, for example, wheel speed data, wheel encoder/position data, heading data from a magnetometer and/or global position data from antenna 545) to determine a control signal for power conversion system 224. While traversing between points, further corrective control signals to the power conversion system 224 may be communicated where the application 625 determines that the received telemetry data from the positioning system 505 is indicative of an error between a sensed position and a desired position along a work path is above an allowable threshold error, or where the sensed heading with respect to the current position will not result in the power machine 405 reaching the subsequent point of the work path.

Referring again to FIG. 4, the user device 415 may be used by an operator of a power machine 405 to define a new work path for a power machine (for example, for a mowing event) associated with a geographical region, or to select a work path 620 from a set or collection of stored work paths 620. Further, in some embodiments, one or more elements of the control system of the power machine 405 (see, e.g., FIG. 5) can be included in or controlled by the user device 415. As one example, in some embodiments, the user device 415 may store the application 625, the set of work paths 620, or a combination thereof. In such an embodiment, the user device 415 may wirelessly communicate control signals for at least one of the tractive system 525 and the work element 510 to control system 515 (of the work machine 405) via communication interface 610.

FIG. 7 is a flowchart illustrating a method 700 for controlling a power machine (for example, the power machine 405) performed by the system 400 according to some embodiments. In some embodiments, the method 700 can be performed by the control system 515 (e.g., the controller 580) and, in particular, the application 625 as executed by the electronic processor 600. However, as noted above, the functionality described with respect to the method 700 may be performed by other devices, including the user device 415, or can be distributed among a plurality of devices or components. Example aspects of the method 700 of FIG. 7 are also described herein with reference to FIG. 8, which is a diagram of an example work path according to some embodiments (represented in FIG. 8 as a dashed line connecting points included within a designated geographical area).

As illustrated in FIG. 7, at block 705, the method 700 includes receiving, with the electronic processor 600, a set of points associated with a geographical area. The set of points may include a series of positional points associated with a geographical area (e.g., positioned at or within a geographical boundary) and can thus be represented in various known formats (e.g., as numerical coordinates in a particular coordinate frame). In some embodiments, the set of points may be associated with performing a work task at (or within) a geographical area. Accordingly, in some embodiments, the set of points may be associated with a work task, a geographical area, or a combination thereof.

As also generally discussed above, the set of points may include a start point, an end point, a subset of intermediate points, or a combination thereof, and may be used to define a work path (e.g., the work path 620) associated with a work task at (or within) a geographical area. For example, FIG. 8 illustrates six points, Points A-F, positioned within a geographical area 805 (represented schematically by a dashed boundary line). In the illustrated example, Point A is a start point, Point F is an end point, and Points B-E are intermediate points. In the illustrated example, the geographical region 805 has a rectangular shape. However, in other embodiments, the geographical region 805 may have another shape, such as a uniform shape (for example, a triangle) or non-uniform shape (for example, a custom shape).

In some embodiments, the electronic processor 600 receives the set of points while an operator maneuvers the power machine 405 within the geographical area 805, including during operation in a learn mode for the power machine 405. For example, in response to an operator initiating a learn mode for the power machine 405 (e.g., via a joystick button), the operator may record points for a work path for a particular work task at a particular geographical area by manually controlling the power machine 405 to travel along the desired work path. While the operator manually controls the power machine 405 to travel along the desired work path, locations along the travel path can be recorded as locational points that can define the work path to be stored. For example, the operator may provide a discrete user input that is associated with each of one or more locations along the travel path to indicate one or more corresponding locations to be recorded to define the work path. In this regard, to indicate a relevant location during travel of a power machine, an operator may provide a user input from the power machine itself, or from a remote device (e.g., the user device 415). In other words, in some embodiments, the operator may utilize the user device 415 as an extension of a human machine interface or other input/output mechanism of the power machine 405. In some embodiments, points can be recorded automatically as a power machine moves along a travel path (e.g., at regular time or spatial intervals or in response to a change of direction or other change in activity). In some specific embodiments, control system 515 may also record data, in conjunction with the work path, related to other operational aspects of the power machine (and associate that data with one or more locations or segments of the work path). For example, other operational aspects of the power machine may include mower deck height, blade speed, mower ground speed, wheel slip, etc.

When an appropriate point along a travel path is identified for a work path (e.g., based on an operator input), the electronic processor 600 may determine a current position of the power machine 405 (e.g., based on position data collected by the positioning system 505) and associate the work-path point with the current position of the power machine within the geographical area (for example, as a geographical location or set of coordinates). Accordingly, in some embodiments, the electronic processor 600 may record points along part or all of a travel path during an operator-controlled operation and can then use those recorded points to control a repeated travel of the power machine along the travel path, including as further discussed below.

Alternatively, or in addition, in some embodiments, the electronic processor 600 receives points from a remote device, such as the user device 415, regardless of a current travel path of a power machine (e.g., when the power machine 405 is not traveling within the geographical area 805). In some embodiments, the remote device is on-site at the geographical area 805 (for example, located within the vicinity of the geographical area). However, in other embodiments, the remote device is off-site from the geographical area 805 (for example, located at another geographical area or location). Such remote data from the user device 415 may allow an operator to remotely plan and execute a work path for the power machine based upon at least one of data provided by the power machine (e.g., telemetry data, imagery, etc.) and satellite imagery interlaid with global positioning information to select a perimeter for a work operation.

In some embodiments, an operator may manually select (e.g., via the user device 415) each locational point to be used to define a work path (or at least a plurality of such points). As one example, the operator may interact with the user device 415 by selecting a geographical area (for example, selecting a geographical area from a list of previously-identified geographical areas, defining a new geographical area, or the like). In response to receiving the geographical area selection, the user device 415 may display or provide (via an output mechanism of the user device 415) a graphical representation of the selected geographical area (for example, a solid or dashed line defining a border of the selected geographical area). The operator may then interact with the graphical representation of the selected geographical area via an input mechanism of the user device 415 to identify points within the relevant area. For example, the operator may view the graphical representation of the selected geographical area and sequentially select multiple points included within the selected geographical area to define a work path, or to define related geographical information (e.g., presence of obstacles, or points along a perimeter or other boundary).

After receiving input to designate the set of points via the input mechanism of the user device 415, the user device 415 may transmit the set of points to the electronic processor 600 (e.g., over the communication network(s) 420) to allow the electronic processor 600 to define a corresponding work path. As noted above, for example, these transmitted points may themselves indicate a work path, or may define a perimeter or other boundary for an area in which a work path can be generated. Alternatively, or in addition, in some embodiments, the user device 415 may further generate a work path based on the selected points and then transmit the generated work path to the electronic processor 600 (e.g., in response to a request for the work path from the electronic processor 600). Accordingly, in some configurations, the work path may be defined by the electronic processor 600 based on the set of points transmitted to the electronic processor 600 from the user device 415. Alternatively, or in addition, in some configurations, the work path may be defined by the user device 415 based on the set of points, and the electronic processor 600 may define the work path for work operations based on the user device 415 transmitting the remotely-defined work path to the electronic processor 600.

In some embodiments, one or more points to define a geographical region for mowing operations (i.e., a perimeter) or a work path can be identified based on locational information for a user device. For example, the user device 415 may include GPS or other locational systems that can (relatively) accurately identify a current location of the user device 415 within a geographical area. Correspondingly, in some embodiments, a user can transport (e.g., manually carry) the user device 415 to different locations within a geographical area and, once in a location that corresponds to part of a desired work path, providing an input to the user device 415 to record that location as a point to define the work path. In this case, as with other designation of points for a work path, the relevant points can sometimes be identified in sequence relative to a progression of travel along a work path, and can sometimes be identified in other orders and then reordered as part of defining the work path.

In some configurations, the recorded points may be associated with a fault. The recorded points may be associated with a fault when a work path resulting from the recorded points is inefficient, incomplete, etc. As one non-limiting example, the recorded points may be associated with a fault when the recorded points define or represent an inefficient work path, such as, e.g., a work path resulting in segments having overlap between passes above a predetermined value or percentage (e.g., a pass overlapping a previous pass by more than 5 inches, 10%, etc.). As another non-limiting example, the recorded points may be associated with a fault when the recorded points define or represent an incomplete work path, such as, e.g., a work path that fails to cover one or more portions of the geographical area 805, a work path resulting in segments that do not overlap, etc. As yet another non-limiting example, the recorded points may be associated with a fault when the recorded points are associated with non-parallel passes within the geographical area 805.

In such configurations, the electronic processor 600 may use the recorded points to determine a perimeter of the geographical area 805 and define the work path based on the perimeter of the geographical area 805. The electronic processor 600 may determine the perimeter of the geographical area 805 such that the perimeter of the geographical area 805 includes one or more of the recorded points. In some configurations, the electronic processor 600 may determine the perimeter of the geographical area 805 such that the perimeter of the geographical area 805 includes each of the recorded points. Alternatively, or in addition, the electronic processor 600 may determine the perimeter of the geographical area 805 such that the perimeter of the geographical area 805 includes a subset of points from the recorded points. Accordingly, in some configurations, the electronic processor 600 may determine the subset of points and determine the perimeter of the geographical area 805 such that the perimeter of the geographical area 805 includes the subset of points. As one non-limiting example, the recorded points may include an outlier point (e.g., a point more than a set distance from the other points). In such cases, the electronic processor 600 may identify the outlier point from the recorded points and determine the perimeter of the geographical area 805 such that the perimeter of the geographical area 805 excludes the outlier point and includes the other non-outlier point(s).

At block 710, after receiving the set of points at block 705, the electronic processor 600 records the points to define a work path for a work task associated with the geographical area 805. In the example illustrated in FIG. 8, points A-F can be recorded in sequence to define a work path traversable by the power machine 405 for performance of a work task associated with the geographical area 805. In some embodiments, the electronic processor 600 records the points by aggregating the points sequentially to define the work path 620 (e.g., to be stored in the memory 605 of the controller 585). Alternatively, or in addition, the electronic processor 600 may transmit the work path 620 to a remote device or database for storage, such as a memory of the user device 415. The electronic processor 600 may also store other operational parameters of the power machine during the recorded work task such as heading, turn-radius, blade RPM, mower deck height, etc.

As illustrated at block 715 of FIG. 7, once a work path has been defined, the electronic processor 600 may then control the power machine 405 to perform an associated work task by traveling along the work path 620. In some embodiments, the electronic processor 600 accesses the work path 620 from the memory 605. Alternatively, or in addition, when the work path 620 is stored remotely, the electrotonic processor 600 may generate and transmit a request for the work path

620. After accessing the work path 620, the electronic processor 600 may generate and transmit one or more appropriate control signals for controlling the power machine 405. For example, the electronic processor 600 may generate and transmit a set of control signals to the tractive system 525, the work element(s) 510, or another component of the power machine 405 (e.g., to implement non-turning travel or turning travel, to raise or lower a mower deck, to rotate one or more cutting elements, etc.). In some embodiments, the electronic processor 600 may control the power machine 405 to perform an associated work task by traveling along the work path 620 and by further controlling a parameter of the work element 510, such as a rotary speed, a deck height or angle, etc.

Generally, the electronic processor 600 controls the power machine 405 to travel along the work path 620 by traveling successively to each point included in the set of points that define the work path. For example, as illustrated in FIG. 8, the electronic processor 600 may control the power machine 405 to perform a non-turning operation by traversing a first distance D1 from point A (as the start point) to point B (as an intermediate point). Upon reaching point B, the electronic processor 60 may control the power machine 405 to perform a turning operation (e.g., a zero-radius turn). After completing the turning operation at point B, the electronic processor 600 may control the power machine 405 to perform a non-turning operation by traversing a second distance D2 from point B to point C (as an intermediate point). Upon reaching point C, the electronic processor 60 may control the power machine 405 to perform another turning maneuver so as to continue to control the power machine 405 to traverse successive distances (e.g., a third distance D3, a fourth distance D4, and a firth distance D5) between points of a work path (e.g., point D, point E, and point F) and perform corresponding turning maneuvers until the power machine 405 reaches an end point (e.g., point F).

In some embodiments, a turning operation along a work path can be defined by way of a subset of recorded points along the turn that correspondingly define characteristics of the turn for a power machine that is traveling along the work path. In some embodiments, a turning operation along a work path can be defined by way of a required rotation of a power machine to continue to travel from a first point along a work path to a second point along the work path. For example, the turns noted above relative to points B-E may sometimes be defined by the required rotation for the power machine to change from the previous heading (e.g., a direction extending from point A to point B) to the next heading (e.g., a direction extending from point B to point C), rather than by discrete points along the turn itself. In one specific embodiment, the work path data may include, in addition to the points defining the work path, additional data which facilitates power machine travel between points. For example, each point may be associated with a heading for the power machine which leads to a subsequent point in the work path, or arrival at a particular point may trigger a sub-routine which causes the power machine to turn (e.g., 90-degree turn, 180-degree turn, etc.). In another specific embodiment, the electronic processor 600 of the controller 580 may analyze upcoming points of the work path (and in some cases past points as well) to determine a path which intersects these points. While traversing between two points of a work path may often require (substantially) linear travel, it may be desirable in some applications to calculate from the upcoming points (and subsequent points) a single radius turn or a variable radius turn that interests each point. In such a case, the controller 580 may control the tractive system

525 to achieve the desired turn by varying the control signals communicated to each drive motor for a period of time. One particular benefit of such an enhanced work path following control scheme is that the resulting travel of the work machine is much smoother.

As also noted above, once a work path has been defined, the electronic process 600 can automatically control the power machine 405 to execute a work task along the work path, including by monitoring a current position of the power machine 405 and controlling tractive (or other) operations based on the current position and one or more points (e.g., a next point in sequence) along the relevant work path. In some embodiments, the electronic processor 600 controls the power machine 405 based on positional data received from the positioning system 515. In some embodiments, the electronic processor 600 additionally or alternatively controls the power machine based on speed data received from the wheel speed sensors 550A-B. In some embodiments, the electronic processor 600 can similarly monitor a current position of the power machine 405 during a learning mode to define a work path, as well as during an automatic mode in which the power machine 405 is controlled to automatically travel along a work path.

In some embodiments, the electronic processor 600 can implement sensor fusion functionality for using in combination different types of position related-data (e.g., wheel speed data and GPS data), including as received from the positioning system 515 and the wheel speed sensors 550A-B. In some embodiments, the electronic processor 600 applies one or more weight factors to the speed data and the GPS data based on a current maneuver or operation of the power machine 405 (e.g., averages or otherwise combines data from different sources based on different weighting, applies one or more different gains to data from different sources in a control loop, or uses other known control approaches to discount or enhance the importance of particular data). In some embodiments, weight factors may be implemented to effectively account for an actual or expected error of GPS data (e.g., may be dependent on an amount of error associated with the GPS data). For example, the electronic processor 600 may apply a first weight factor to the wheel speed data and a second weight factor to the GPS data depending on whether the GPS data is expected to be more or less accurate. Further, some examples can select weight factors with particular or general relative scaling based on a type of operation that is being executed by a power machine (e.g., by a zero-turn mower). Thus, in general, some implementations can assign larger weighting factors (e.g., numerically larger gain) to data from actuators of a power machine during certain operations, with correspondingly smaller weighting factors (e.g., numerically smaller gain) to GPS data.

As one example, when the current operation of the power machine 405 is a turning operation, particularly a zero-radius turn (or turn on a zero turn mower, in particular), a relatively small-speed non-rotational travel combined with a relatively high-speed rotation may result in reduced accuracy for GPS data for a power machine. Accordingly, for some turning operations, a weighting factor for wheel speed data may be relatively large (e.g., 75%) while a weighting factor for GPS data may be relatively small (e.g., 25%). In other words, generally, a control loop can be configured to combine GPS and wheel speed (or other actuator) data with a greater weighting for data from the power machine than for data from the GPS. As another example, when the current operation of the power machine 405 is a non-turning operation (or is a turning operation with at least a minimum turn radius), GPS data may be expected to be more accurate, and a weighting factor for wheel speed data may be relatively small (e.g., 25%) while a weighting factor for GPS data may be relatively large (e.g., 75%). In other words, generally, a control loop can be configured to combine GPS and wheel speed (or other actuator) data with a greater weighting for data from the GPS than for data from the power machine.

In some implementations, a current operation of a power machine can be determined by a control system during controlled travel along a work path. In some cases, a current operation can be identified based on an identified correspondence between a power machine location and a portion of a work path. For example, turning travel of a power machine can be identified based on a control system identifying that a current point of travel along a work path is part of a turn on the work path or immediately proceeds such a turn. Further, in some cases, a degree or speed of a current or upcoming turning (or other) operation can be similarly identified.

Although wheel speed data may be particularly useful in the contexts discussed above, other embodiments can employ other data relative to a power machine to supplement or replace external locational data. For example, encoders or other devices can measure relative movements of tractive elements of a power machine over time, including ground-engaging elements, transmission components, and drive actuators, as can allow calculation of relative travel of the power machine. In some cases, wheel speed data can be determined based on wheel speed sensors directly associated with particular wheels (or other tractive elements), as discussed above and generally illustrated in FIG. 5. Alternatively, or in addition, in some cases, wheel speed data can be determined using other sensors, including sensors associated with tractive actuators of a power machine (e.g., other arrangements to measure motor speed directly or indirectly).

In some embodiments, the electronic processor 600 is configured to determine when the power machine 405 arrives at an end point of the work path 620 (for example, by comparing a current position of the power machine 405 to a geographical location associated with the end point). In response to determining that the power machine 405 is at the end point of the work path 620, the electronic processor 600 may generate or transmit a set of control signals associated with an end operation of the power machine 405. In some embodiments, the end operation includes controlling the power machine 405 to travel along the work path 620 in a reverse order, such that the power machine 405 returns to the start point. As one example, with reference to FIG. 8, the electronic processor 600 may control the power machine 405 to travel from point F to point E, from point E to point D, from point D to point C, from point C to point B, and from point B to point A.

Alternatively, or in addition, in some embodiments, the end operation includes controlling the power machine 405 to travel along a return path associated with the work path 620, where the return path returns the power machine 405 to a start point of the work path 620 but not necessarily along the work path 620. As one example, with reference to FIG. 8, the electronic processor 600 may control the power machine 405 to travel along a return path from point F to point E and from point E to point A (e.g., by way of point C). As another example, with reference to FIG. 8, the electronic processor 600 may control the power machine 405 to travel along a return path from point F to point B (e.g., by way of point D) and from point B to point A. Alternatively, or in addition, in some embodiments, the end operation includes controlling the power machine 405 to travel to a start point of a different work path, which may be associated with an additional work task or an additional geographical area. Thus, for example, some implementations can include continued operation along a work path (e.g., a continuous mowing of a large area) by retracing a work path in reverse or by returning to a previous location along the work path (e.g., a start point) by a shortest-possible or other path.

As noted above, a geographical area may be associated with more than one work path, and operation of a power machine may correspondingly include selecting a particular work path before controlling travel along it. For example, a geographical area may be associated with a first work path and a second work path different from the first work path. Accordingly, in some embodiments, the method 700 includes the electronic processor 600 receiving a work path selection indicating whether the first or the second work path (or both) are to be used for an upcoming work task (e.g., between blocks 710 and 715 in FIG. 7). The electronic processor 600 may receive the work path selection from a local component of the power machine 405, such as, for example, a human machine interface of the power machine 405. Alternatively, or in addition, the electronic processor 600 may receive the work path selection from a remote device, such as, for example, the user device 415. In response to receiving the work path selection, the electronic processor 600 may access the work path selected by the work path selection and then control the power machine to travel along the work path to complete the relevant work task.

In some embodiments, the controller 580 provides object detection functionality that detects objects positioned along the work path 620. For example, the power machine 405 may include one or more object detection sensors, such as LIDAR sensors, radar sensors, or the like for detecting the presence of an object along the work path 620 (or elsewhere). The object detection sensors may be positioned or coupled to the main frame of the power machine 405 at various locations, including on a front portion of the main frame (e.g., as shown for sensors 270 in FIG. 2).

In different implementations, the controller 580 can utilize different modes for travel with object detection, including based on a selection of an object detection mode by an operator. For example, with reference to FIG. 9A, in a first object detection mode, the controller 580 may control the power machine 405 to stop prior to an object 905, when the controller 580 detects the object 905 within the work path 620 of the power machine 405. In a second example object detection mode, with reference to FIG. 9B, when the controller 580 detects an object 905 within the work path 620 of the power machine 405, the controller 580 may control the power machine 405 to stop prior to the object 905 and issue an alert that the power machine 405 as stopped. For example, a local alert for an operator in or near the power machine 405 can be provided (e.g., audially or visually), or a remote alert for a remote operator can be provided. As illustrated in FIG. 9B, for example, the controller 580 may generate and transmit the alert or notification to a remote device 910, such as, e.g., the user device 910. As yet another example, with reference to FIG. 9C, when the controller 580 detects an object 905 within the work path 620 of the power machine 405, the controller 580 may control the power machine 405 to travel along an alternative work path (segment) that avoids the object 905.

In the illustrated example, the controller 580 controls the power machine 405 to avoid a first object 905A (as a first alternative work path segment represented in FIG. 9C as a dotted line associated with reference numeral 915A) and a second object 905B (as a second alternative work path segment represented in FIG. 9C as a dotted line associated with reference numeral 915B). Thus, in some embodiments, an object avoidance mode can add points to a path along which the power machine automatically travels. In some embodiments, the newly added points may be followed for a single pass. For example, the path taken to avoid the object is not entered into a saved path for use in the future.

Alternatively, the newly added points may be entered into a saved path for future use. In some specific embodiments, the newly added points associated with the first/second alternative work path segments may be entered into a saved path for future use where the first/second object is detected in two or more consecutive executions of the travel path. The alternative work path segment, which in many cases is a temporary divergence of the work path, may be stored along with the original work path (i.e., the work path absent the divergence) or may be stored to replace all or part of the original work path. When executing the work path in an automatic mode of the power machine, upon arriving at a split between points associated with the original work path and the path divergence, if the power machine does not detect the object 905 the controller 580 can in some cases continue to execute the original work path. However, if the object 905 is detected again, the controller 580 can execute the previously utilized diverging work path (or determine another alternative work path) to traverse around the object and, as appropriate, rejoin the original (or other) work path.

In different embodiments, a power machine (e.g., the power machine 100, the mower 200, or the like) can be configured to function in one or more operation modes with different levels of automatic implementation and features. For example, when not operating in an automated operation mode, a power machine may in some cases be operable in a remote control mode or a local control mode.

When a power machine is configured to function in a remote control mode, the power machine may be driven using a remote device, such as, for example, by way of manual inputs at the user device 415. For example, FIG. 10A illustrates a remote control mode configuration of the power machine 405 according to some embodiments. In the configuration illustrated in FIG. 10A, the power machine 405 includes an antenna 1005 in communication (represented by reference numeral 1010) with a remote-control device 1015 (such as, e.g., the user device 415, as described above). In some such embodiments, the power machine 405 receives control signals from the remote-control device 1015 at the antenna 1005 and the power machine 405 can thus be controlled based on the received control signals. In some embodiments, a remote control mode may be implemented on power machines that do not include an operator station on the power machine, including as illustrated in FIG. 10A.

When a power machine is configured to function in a local control mode, the power machine may include an operator station positioned on the power machine. For example, as illustrated in FIG. 10B, the power machine 405 includes an operator station (represented in FIG. 10B as a seat 1050) from which an operator can control the power machine 405. As also illustrated in FIG. 10B, in some such configurations, the power machine 405 may also include an antenna 1055. Thus, for example, an operator may ride on the power machine 405 and provide operator input or comments via one or more operator input devices positioned on the power machine 405, or the power machine 405 can be controlled by a remote device. Alternatively, or in addition, in some embodiments, the power machine 405 may function automatically (e.g., as commanded by control signals received with the antenna 1055), including while an operator is positioned in the operator station (e.g., is sitting on the seat 1050 of the power machine 405).

There are various methods to defining a work path (e.g., the work paths 620 of FIGS. 9A-9C), some of which are also discussed in greater detail above. As one example, a work path may be generated using an application operable from a computing device (e.g., a desktop map tool available as an online application). The application may display a map of a geographical area and allow a user to designate points within the geographical area. For example, the user may use manual inputs on a touchscreen to designate points representing obstacles, waypoints, or the like on a graphical representation of a geographical area. As another example, a work path may be generated to correspond to a path of travel of the power machine 405. For example, the travel path of the power machine 405 during operation in a local or remote control mode can be recorded as a work path for later operations (e.g., based on an operator input at an operator station).

As yet another example, a work path may be generated using a separate tool or device that can detect or record locational data (e.g., boundaries, obstacles, waypoints, or the like). In some embodiments, an operator can manually generate the work path 620 (e.g., a collection device mapping tool). For example, using a GPS-enabled device, an operator may walk along a geographical area and provide various inputs to the device to mark relevant points, including a location of an obstacle, a way point, or the like. The collection of marked points can then be used to generate the work path 620 (e.g., to define a boundary and a set of points that define a work path within the boundary). As yet another example, a work path 620 may be generated using one or more boundary devices, including a stake, a beacon, or the like as can be physically located in a geographical area to transmit to a power machine boundary or path information for the geographical area during a mowing event (or otherwise). As yet another example, a work path may be generated using map information (e.g., relative and absolute spatial arrangements of terrain features, topographic mapping, etc.), which can be received from communication with mobile devices (e.g., cell phones), from navigational systems of power machines, or otherwise. In some cases, map information can indicate part or all of a perimeter boundary, or can indicate relative or absolute locations of obstacles within a relevant area.

In some implementations, an operator may designate an outside boundary for a work task (e.g., a mowing event). The outside boundary may be designated in some cases by an operator riding or remotely controlling the power machine to traverse the boundary and to record the relevant points, or by the operator walking the boundary and recording the relevant points on a mobile device. In some cases, an outside boundary can be designated by utilizing an application on the operator's mobile device or the power machine itself to display a map of a geographical area and to allow a user to define the boundary visually (e.g., via touch-screen or other engagement with the map to designate a path of boundary or points along a boundary). Based on the user provided information indicative of a designated boundary, a work path may then be generated based on geometric or other analysis to identify an optimal work path for the boundary, geographical area, the task, etc. As discussed in some detail above, path generation may be conducted by the controller 580 of the power machine, one or more processors of the mobile device, or a remote server. Alternatively, or in addition, a boundary device may be positioned to mark an obstacle, a waypoint, or the like associated with the geographical area. A control system can then detect the boundary device and determine a work path accordingly (e.g., as variously discussed above).

As yet another example, a work path may be generated using an automatic detection system (e.g., an auto detect map tool). For example, once a boundary of relevant area has been determined, or as part of detecting such a boundary, a work path may be generated based on movement of a power machine around the relevant area and sensor input received from the power machine corresponding to that movement. For example, a power machine may randomly move about a designated (bounded) area to accumulate map information regarding terrain, obstacles, ground characteristics, or other features and can then determine a work path based on that map information (e.g., as supplemented by operator input or other data). As another example, a power machine can move within an area according to a first work path (e.g., as defined by waypoints manually selected by an operator), accumulate data from onboard sensors regarding the area and the first work path, and then automatically determine a second work path within the area (e.g., to improve certain operations relative to the first work path).

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise expressly limited or defined, the term "automatic operations" refers to operations that are at least partly dependent on electronic application of computer algorithms for decision-making without human intervention. In this regard, unless otherwise expressly limited or defined, "automatic travel" refers to travel of a power machine or other vehicle in which at least some decisions regarding steering, speed, distance, or other travel parameters are made without direct intervention by a human operator. Relatedly, the term "automated operations" (and the like), unless otherwise expressly limited or defined, refers to a subset of automatic operations for which no intervention by a human operator is required. For example, automated travel can refer to automatic travel of a power machine or other vehicle during which steering, speed, distance, or other travel parameters are determined in real time without operator input. In this regard, however, operator input may sometimes be received to start, stop, interrupt, or define parameters (e.g., top speed) for automated travel or other automated operations.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some embodiments, a control device can include a centralized hub controller that receives, processes and (re)transmits control signals and other data to and from other distributed control devices (e.g., an engine controller, an implement controller, a drive controller, etc.), including as part of a hub-and-spoke architecture or otherwise.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A method of controlling a power machine, the method comprising:

receiving a set of points associated with a geographical area;

with an electronic processor, recording the set of points associated with the geographical area, and defining with the set of points a work path for a work task associated with the geographical area;

with the electronic processor, receiving position data associated with the power machine, wherein the position data comprises wheel speed data and global positioning system ("GPS") data; and with the electronic processor, controlling, based on the position data, the power machine to perform the work task by traveling along the work path, wherein the power machine traveling in a first direction along the work path includes traveling successively to each point included in the set of points, wherein controlling the power machine includes:

determining a current operation of the power machine; and in response to determining that the current operation is a turning operation, applying a first weighting factor to the wheel speed data and a second weighting factor to the GPS data, wherein the first weighting factor is greater than the second weighting factor.

2. The method of claim 1, wherein receiving the set of points associated with the geographical area includes receiving the set of points based on a position of the power machine while an operator controls travel of the power machine within the geographical area.

3. The method of claim 2, wherein receiving the set of points further includes:

receiving a user input from the operator while the operator controls travel of the power machine within the geographical area; and in response to receiving the user input:

determining a current position of the power machine within the geographical area; and adding the current position as a new point to the set of points.

4. The method of claim 1, wherein receiving the set of points associated with the geographical area includes receiving the set of points from a remote device, wherein the set of points are selected by an operator using the remote device.

5. The method of claim 1, further comprising:

determining that the power machine is at an end point of the work path; and in response to determining that the power machine is at the end point of the work path, controlling the power machine to travel along a return path being different from the work path, wherein the return path returns the power machine to a start point of the work path.

6. The method of claim 1, further comprising:

determining that the power machine is at an end point of the work path; and in response to determining that the power machine is at the end point of the work path, controlling the power machine to travel along a subsequent work path, the subsequent work path associated with at least one of: an additional work task or an additional geographical area.

7. The method of claim 1, further comprising:

determining a current operation of the power machine; and in response to determining that the current operation is a non-turning operation, applying a first weighting factor to the wheel speed data and a second weighting factor to the GPS data, wherein the first weighting factor is less than the second weighting factor.

8. A power machine comprising:

a main frame;

a work element coupled to the main frame;

a plurality of electrical actuators coupled to the main frame;

an electrical power source configured to power the plurality of electrical actuators; and an electronic controller in communication with the plurality of electrical actuators, the electronic controller configured to:

operate in a learn mode in response to an operator input, including:

receiving a set of points associated with a geographical area, recording the set of points associated with the geographical area as a first work path for a work task associated with the geographical area, and in response to receiving an operator selection associated with the first work path:

receive position data associated with the power machine, wherein the position data comprises wheel speed data and global positioning system ("GPS") data; and control, based on the position data, the power machine to perform the work task by traveling along the first work path in a first direction, wherein the control of the power machine includes:

determining a current operation of the power machine; and in response to determining that the current operation is a turning operation, applying a first weighting factor to the wheel speed data and a second weighting factor to the GPS data, wherein the first weighting factor is greater than the second weighting factor.

9. The power machine of claim 8, wherein the power machine is an automatic mower and the work element includes a mowing device powered by the electrical power source.

10. The power machine of claim 8, wherein the electronic controller is further configured to store a plurality of work paths corresponding to a plurality of sets of points associated with one or more geographical areas, the plurality of work paths including the first work path; and wherein the operator selection is a selection of the first work path from the plurality of work paths, and wherein the electronic controller is configured to control the power machine to perform the work task by traveling along a second work path in response to receiving a selection of the second work path from the plurality of work paths, the second work path being different from the first work path.

11. The power machine of claim 8, wherein receiving the set of points includes:

receiving a user input from an operator while the operator maneuvers the power machine within the geographical area, and in response to receiving the user input, determining a current position of the power machine within the geographical area; and adding to the set of points a new point associated with the current position of the power machine.

12. The power machine of claim 8, wherein the electronic controller is configured to receive the set of points from a remote device, wherein the set of points are selected by an operator of the power machine via the remote device.

13. The power machine of claim 8, wherein the electronic controller is further configured to determine that the power machine is at an end point of the first work path; and in response to determining that the power machine is at the end point of the first work path, control the power machine to travel along a subsequent work path, the subsequent work path associated with at least one of: an additional work task or an additional geographical area.

14. A method of controlling a power machine, the method comprising:

receiving, with an electronic processor, a set of points associated with a geographical area;

defining, with the electronic processor, based on the set of points, a perimeter for mowing operations;

with the electronic processor, determining a work path for a work task associated with the geographical area, wherein the work path is included within and determined based on the perimeter;

with the electronic processor, receiving position data associated with the power machine, wherein the position data comprises wheel speed data and global positioning system ("GPS") data; and with the electronic processor, controlling, based on the position data, the power machine to perform the work task by traveling along the work path, wherein controlling the power machine includes:

determining a current operation of the power machine; and in response to determining that the current operation is a turning operation, applying a first weighting factor to the wheel speed data and a second weighting factor to the GPS data, wherein the first weighting factor is greater than the second weighting factor.

15. The method of claim 14, further comprising:

receiving, from a mobile device, a location of an obstacle within the geographical area, the location being indicated by an operator using the mobile device;

wherein determining the work path is further based on the location of the obstacle.

16. The method of claim 15, wherein receiving the set of points includes receiving a set of perimeter points selected by an operator using the mobile device.

17. The method of claim 15, further comprising:

detecting a presence of an obstacle along the work path, during travel of the power machine along the work path to perform the work task; and in response to detecting the presence of the obstacle along the work path:

controlling the power machine to stop travel along the work path; and issuing an alert to a remote device to indicate that travel of the power machine has stopped.

18. The method of claim 14, further comprising:

receiving map information associated with the geographical area; and detecting, based on the map information, a presence of an obstacle;

wherein determining the work path is further based on the detected presence of the obstacle.

19. The method of claim 14, further comprising:

detecting a presence of an obstacle along the work path, during travel of the power machine along the work path to perform the work task; and in response to detecting the presence of the obstacle along the work path:

determining an alternative work path that avoids the obstacle and remains within the geographical area; and controlling the power machine to perform the work task by traveling along the alternative work path.

* * * * *